United States Patent
Nishide et al.

(10) Patent No.: US 12,300,827 B2
(45) Date of Patent: May 13, 2025

(54) SOLID-STATE BATTERY

(71) Applicant: Murata Manufacturing Co., Ltd., Nagaokakyo (JP)

(72) Inventors: Mitsuyoshi Nishide, Nagaokakyo (JP); Tomohiro Kato, Nagaokakyo (JP); Takayuki Nagano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 700 days.

(21) Appl. No.: 17/487,565

(22) Filed: Sep. 28, 2021

(65) Prior Publication Data
US 2022/0013846 A1 Jan. 13, 2022

Related U.S. Application Data

(63) Continuation of application No. PCT/JP2020/014306, filed on Mar. 27, 2020.

(30) Foreign Application Priority Data

Mar. 29, 2019 (JP) .................. 2019-068107

(51) Int. Cl.
H01M 50/16 (2021.01)
H01M 10/052 (2010.01)
H01M 10/0525 (2010.01)
H01M 10/0562 (2010.01)
H01M 10/0585 (2010.01)
H01M 10/42 (2006.01)
(Continued)

(52) U.S. Cl.
CPC ......... *H01M 50/16* (2021.01); *H01M 10/052* (2013.01); *H01M 10/0525* (2013.01); *H01M 10/0562* (2013.01); *H01M 10/0585* (2013.01); *H01M 10/425* (2013.01); *H01M 10/48* (2013.01); *H01M 50/103* (2021.01); *H01M 50/117* (2021.01); *H01M 50/124* (2021.01); *H01M 50/157* (2021.01); *H01M 50/164* (2021.01); *H01M 50/176* (2021.01); *H01M 50/55* (2021.01); *H01M 50/574* (2021.01); *H01M 50/588* (2021.01); *H01M 50/591* (2021.01); *H01M 2010/4271* (2013.01)

(58) Field of Classification Search
CPC ........ H01M 10/0562; H01M 10/0585; H01M 10/425; H01M 10/48; H01M 10/486
See application file for complete search history.

(56) References Cited

U.S. PATENT DOCUMENTS 8,228,023 B2 6/2012 Sather et al.
9,793,522 B2 10/2017 Bhardwaj et al.
(Continued)

FOREIGN PATENT DOCUMENTS

JP 2004320011 A * 11/2004 ............ H01L 23/58
JP 2007005279 A 1/2007
(Continued)

OTHER PUBLICATIONS

Machine Translation of JP 2004320011A (Year: 2004).*
(Continued)

Primary Examiner — Gregg Cantelmo
(74) Attorney, Agent, or Firm — ArentFox Schiff LLP

(57) ABSTRACT

A battery that includes a substrate, a solid-state battery on the substrate, and a circuit for the solid-state battery on the substrate.

18 Claims, 10 Drawing Sheets

(51) Int. Cl.
*H01M 10/48* (2006.01)
*H01M 50/103* (2021.01)
*H01M 50/117* (2021.01)
*H01M 50/124* (2021.01)
*H01M 50/157* (2021.01)
*H01M 50/164* (2021.01)
*H01M 50/176* (2021.01)
*H01M 50/55* (2021.01)
*H01M 50/574* (2021.01)
*H01M 50/588* (2021.01)
*H01M 50/591* (2021.01)

(56) References Cited

U.S. PATENT DOCUMENTS

| | | | |
|---|---|---|---|
| 2004/0131897 A1* | 7/2004 | Jenson | H01M 50/119 429/162 |
| 2004/0185667 A1* | 9/2004 | Jenson | H01L 31/073 438/689 |
| 2008/0073414 A1* | 3/2008 | Saito | B23K 35/362 228/259 |
| 2008/0203972 A1 | 8/2008 | Sather et al. | |
| 2008/0241665 A1* | 10/2008 | Sano | H01M 10/0525 429/149 |
| 2008/0274412 A1 | 11/2008 | Yamada | |
| 2009/0197178 A1* | 8/2009 | Inda | H01M 10/0562 429/231.95 |
| 2010/0167130 A1 | 7/2010 | Pijenburg et al. | |
| 2012/0101540 A1* | 4/2012 | O'Brien | A61N 1/3758 257/415 |
| 2013/0017435 A1 | 1/2013 | Sato et al. | |
| 2013/0164607 A1* | 6/2013 | Shih | H01M 10/052 29/730 |
| 2013/0341205 A1* | 12/2013 | Baba | H01M 10/052 205/656 |
| 2016/0049624 A1 | 2/2016 | Bhardwaj et al. | |
| 2018/0277907 A1 | 9/2018 | Wasaki et al. | |

FOREIGN PATENT DOCUMENTS

| | | | | |
|---|---|---|---|---|
| JP | 2010503957 A | 2/2010 | | |
| JP | 2011216235 A | 10/2011 | | |
| JP | 2013084624 A | 5/2013 | | |
| JP | 2015220102 A | 12/2015 | | |
| JP | 2015220107 A | 12/2015 | | |
| JP | 2017523575 A | 8/2017 | | |
| JP | 2018163870 A | 10/2018 | | |
| WO | WO-9732457 A1 * | 9/1997 | ......... H01L 21/4853 | |
| WO | WO-2018087966 A1 * | 5/2018 | ......... H01M 10/052 | |
| WO | 2018212120 A1 | 11/2018 | | |

OTHER PUBLICATIONS

Machine Translation of WO-2018087966-A1 (Year: 2018).*
International Search Report issued in PCT/JP2020/014306, dated Jun. 23, 2020.
Written Opinion of the International Search Report issued in PCT/JP2020/014306, dated Jun. 23, 2020.

* cited by examiner

SOLID-STATE BATTERY

CROSS REFERENCE TO RELATED APPLICATIONS

The present application is a continuation of International application No. PCT/JP2020/014306, filed Mar. 27, 2020, which claims priority to Japanese Patent Application No. 2019-068107, filed Mar. 29, 2019, the entire contents of each of which are incorporated herein by reference.

FIELD OF THE INVENTION

The present invention relates to a solid-state battery. More specifically, the present invention relates to a packaged solid-state battery.

BACKGROUND OF THE INVENTION

Hitherto, secondary batteries that can be repeatedly charged and discharged have been used for various purposes. For example, secondary batteries are used as a power supply for electronic devices such as smartphones and notebook computers.

In secondary batteries, liquid electrolytes are generally used as a medium for ionic migration that contributes to charge and discharge. In other words, so-called electrolytic solutions are used in secondary batteries. However, in such secondary batteries, safety is generally required from the viewpoint of preventing leakage of the electrolytic solutions. The organic solvents and the like used in electrolytic solutions are flammable substances, and safety is required in that point of view as well.

Hence, studies have been conducted on solid-state batteries in which solid electrolytes are used instead of electrolytic solutions.

Patent Document 1: Japanese Patent Application Laid-Open No. 2015-220107
Patent Document 2: Japanese Patent Application Laid-Open No. 2007-5279

SUMMARY OF THE INVENTION

The inventors of the present application have realized that solid-state batteries have still problems to be overcome, and have found that it is required to take measures for the problems. Specifically, the inventors of the present application have found that there are the following problems.

Solid-state batteries are required to have a structure in which the materials which cause the battery reaction themselves are shielded from the external environment and the ingress of water vapor and foreign matters and the leakage of battery reactants are prevented. In this regard, lithium-ion batteries which are widely used as secondary batteries are sealed using, for example, an aluminum laminate film as a pouch (hereinafter, such a pouch is also referred to as an "aluminum laminate pouch"). Peripheral circuit boards are connected to the positive and negative terminals taken out from the aluminum laminate pouch, and the battery is provided as an integrated package.

In such a lithium-ion battery, an aluminum laminate pouch protects the battery body. Only the tabs drawn out from the electrodes are exposed to the outside of the aluminum laminate pouch, and electricity is obtained through the tabs. However, the "margin portion" used for sealing of the aluminum laminate pouch is required to jut out to the surroundings, and it is structurally difficult to decrease the package volume. It is conceivable to house the peripheral circuit board in the space on the outer side of the aluminum laminate pouch and perform packaging, but it is not particularly effective in the decrease in overall volume. Rather, such packaging has a double package structure and thus may increase unnecessary volume.

For this reason, it is not always a good idea to follow the concept of aluminum laminate pouch of lithium battery when solid-state batteries are sealed, and it is required to take a new approach from the viewpoint of compactification of solid-state batteries.

The present invention has been made in view of such problems. In other words, a main object of the present invention is to provide a solid-state battery packaging technology that contributes to compactification while having sealing properties.

The inventors of the present application have attempted to solve the above problems by dealing with the problems in a new direction instead of dealing with the problems as an extension of the prior art. As a result, the invention of a solid-state battery by which the main object is achieved has been completed.

The present invention provides a battery that includes a substrate, a solid-state battery on the substrate, and a circuit for the solid-state battery on the substrate.

The solid-state battery according to the present invention is a solid-state battery package product that is suitable for compactification while having sealing properties.

More specifically, the solid-state battery is mounted on the substrate and packaged from the viewpoint of preventing water vapor transmission and the like as well as a "circuit for the solid-state battery" is provided on the substrate from the viewpoint of compactification. In other words, the "circuit for the solid-state battery" is provided on the surface of the substrate but not inside the substrate. The substrate is originally used for packaging, and is also utilized for installing peripheral circuits of solid-state batteries, and thus the overall size thereof is not increased inconveniently. Consequently, the present invention provides a compact package product as a whole while achieving sealing of the solid-state battery.

DETAILED DESCRIPTION OF THE INVENTION

Figure 1:
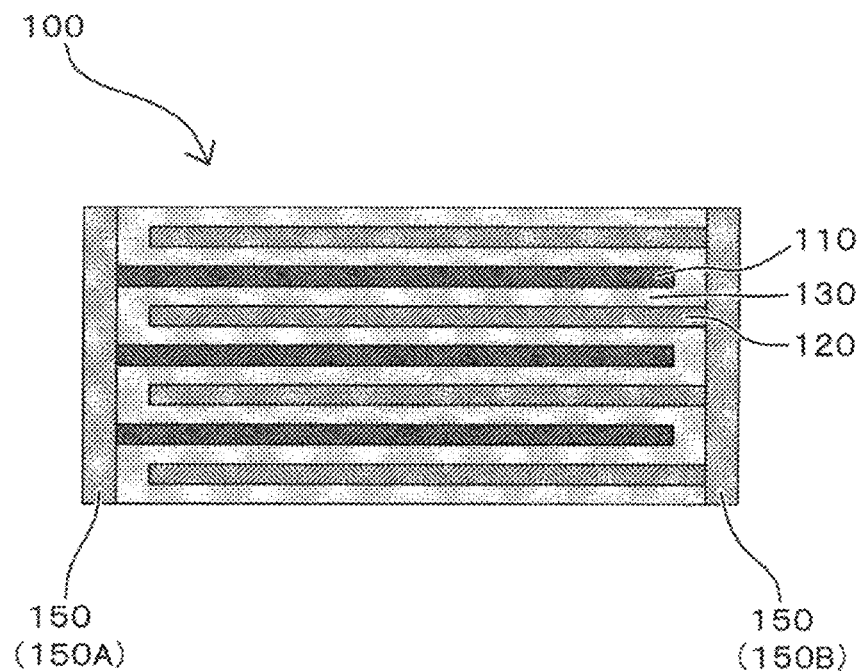
FIG. 1 is a sectional view schematically illustrating the internal configuration of a solid-state battery.

Hereinafter, the solid-state battery of the present invention will be described in detail. Although the description will be given with reference to the drawings if necessary, the contents illustrated are merely schematic and exemplary for the purpose of understanding the present invention, and the appearance, dimensional ratio, and the like may differ from the actual ones.

The solid-state battery of the present invention corresponds to a packaged solid-state battery. The term "packaged solid-state battery" as used in the present specification means a solid-state battery protected from the external environment in a broad sense, and refers to a solid-state battery that is sealed so that water vapor in the external environment does not enter the inside of the solid-state battery. Preferably, the solid-state battery of the present invention into which such moisture transmission is prevented is packaged so as to be suitable for mounting on a secondary substrate, and is packaged so as to be suitable particularly for surface mounting. Consequently, in a certain suitable aspect, the battery of the present invention is an SMD (Surface Mount Device) type battery.

The term "sectional view" as used in the present specification is based on the form when viewed from a direction substantially perpendicular to the thickness direction based on the laminated direction of the respective layers constituting the solid-state battery (in short, the form when cut in a plane parallel to the thickness direction). The "vertical direction" and "horizontal direction" used directly or indirectly in the present specification correspond to the vertical direction and the horizontal direction in the drawings, respectively. Unless otherwise stated, the same reference numerals or symbols shall indicate the same members/parts or the same meanings. In a certain suitable aspect, it can be considered that the vertical downward direction (namely, the direction in which gravity acts) corresponds to the "downward direction"/"bottom face side" and the opposite direction corresponds to the "upward direction"/top face side.

The "solid-state battery" as used in the present invention refers to a battery of which the constituents are formed of solids in a broad sense and refers to an all-solid-state battery of which the constituents (particularly preferably all constituents) are formed of solids in a narrow sense. In a certain suitable aspect, the solid-state battery in the present invention is a laminated solid-state battery in which the respective layers forming the battery constituting unit are laminated one on another, and preferably the respective layers are formed of sintered bodies. The "solid-state battery" includes not only a so-called "secondary battery" capable of being repeatedly charged and discharged but also a "primary battery" capable of only being discharged. According to a certain suitable aspect of the present invention, a "solid-state battery" is a secondary battery. The "secondary battery" is not overly bound by its name and may include, for example, a power storage device.

Hereinafter, the basic configuration of the solid-state battery of the present invention will be first described. The configuration of the solid-state battery described here is merely an example for understanding the invention, and does not limit the invention.

[Basic Configuration of Solid-State Battery]

A solid-state battery includes at least positive and negative electrode layers and a solid electrolyte. Specifically, as illustrated in FIG. 1, a solid-state battery 100 includes a solid-state battery laminate having a battery constituting unit consisting of a positive electrode layer 110, a negative electrode layer 120, and a solid electrolyte 130 at least interposed between these electrode layers.

In the solid-state battery, since the respective layers constituting the solid-state battery are formed by firing, the positive electrode layer, the negative electrode layer, the solid electrolyte, and the like form sintered layers. Preferably, the positive electrode layer, the negative electrode layer, and the solid electrolyte are integrally fired with each other, and thus the solid-state battery laminate forms an integrally sintered body.

The positive electrode layer 110 is an electrode layer containing at least a positive electrode active material. The positive electrode layer may further contain a solid electrolyte. In a certain suitable aspect, the positive electrode layer is formed of a sintered body containing at least positive electrode active material particles and solid electrolyte particles. Meanwhile, the negative electrode layer is an electrode layer containing at least a negative electrode active material. The negative electrode layer may further contain a solid electrolyte. In a certain suitable aspect, the negative electrode layer is formed of a sintered body containing at least negative electrode active material particles and solid electrolyte particles.

The positive electrode active material and the negative electrode active material are substances involved in the transfer of electrons in the solid-state battery. Charge and discharge proceeds as ions migrate (are conducted) between the positive electrode layer and the negative electrode layer via the solid electrolyte and thus electrons are transferred. The positive electrode layer and the negative electrode layer are particularly preferably layers capable of storing and releasing lithium ions or sodium ions. In other words, the solid-state battery is preferably an all-solid-state secondary battery in which the battery is charged and discharged as lithium ions or sodium ions migrate between the positive electrode layer and the negative electrode layer via the solid electrolyte.

(Positive Electrode Active Material)

Examples of the positive electrode active material contained in the positive electrode layer include at least one selected from the group consisting of a lithium-containing phosphate compound having a NASICON-type structure, a lithium-containing phosphate compound having an olivine-type structure, a lithium-containing layered oxide, and a lithium-containing oxide having a spinel-type structure. Examples of the lithium-containing phosphate compound having a NASICON-type structure include $Li_3V_2(PO_4)_3$. Examples of the lithium-containing phosphate compound having an olivine-type structure include $Li_3Fe_2(PO_4)_3$, $LiFePO_4$, and/or $LiMnPO_4$. Examples of the lithium-containing layered oxide include $LiCoO_2$ and/or $LiCo_{1/3}Ni_{1/3}Mn_{1/3}O_2$. Examples of the lithium-containing oxide having a spinel-type structure include $LiMn_2O_4$ and/or $LiNi_{0.5}Mn_{1.5}O_4$.

Examples of the positive electrode active material capable of storing and releasing sodium ions include at least one selected from the group consisting of a sodium-containing phosphate compound having a NASICON-type structure, a sodium-containing phosphate compound having an olivine-type structure, a sodium-containing layered oxide, and a sodium-containing oxide having a spinel-type structure.

(Negative Electrode Active Material)

Examples of the negative electrode active material contained in the negative electrode layer 120 include at least one selected from the group consisting of oxides containing at least one element selected from the group consisting of Ti, Si, Sn, Cr, Fe, Nb, and Mo, a graphite-lithium compound, a lithium alloy, a lithium-containing phosphate compound having a NASICON-type structure, a lithium-containing phosphate compound having an olivine-type structure, and a lithium-containing oxide having a spinel-type structure. Examples of the lithium alloy include Li—Al. Examples of the lithium-containing phosphate compound having a NASICON-type structure include $Li_3V_2(PO_4)_3$ and/or $LiTi_2(PO_4)_3$. Examples of the lithium-containing phosphate compound having an olivine-type structure include $Li_3Fe_2(PO_4)_3$ and/or $LiCuPO_4$. Examples of the lithium-containing oxide having a spinel-type structure include $Li_4Ti_5O_{12}$.

Examples of the negative electrode active material capable of storing and releasing sodium ions include at least one selected from the group consisting of a sodium-containing phosphate compound having a NASICON-type structure, a sodium-containing phosphate compound having an olivine-type structure, and a sodium-containing oxide having a spinel-type structure.

The positive electrode layer and/or the negative electrode layer may contain a conductive auxiliary agent. Examples of the conductive auxiliary agent contained in the positive electrode layer and negative electrode layer include at least one formed of metal materials such as silver, palladium, gold, platinum, aluminum, copper, and nickel, carbon and the like. Although not particularly limited, copper is preferable since copper does not easily react with positive electrode active materials, negative electrode active materials, solid electrolyte materials and the like and is effective in lowering the internal resistance of solid-state battery.

The positive electrode layer and/or the negative electrode layer may contain a sintering auxiliary agent.

Examples of the sintering auxiliary agent include at least one selected from the group consisting of lithium oxide, sodium oxide, potassium oxide, boron oxide, silicon oxide, bismuth oxide, and phosphorus oxide.

(Solid Electrolyte)

The solid electrolyte is a material capable of conducting lithium ions or sodium ions. In particular, the solid electrolyte, which forms a battery constituting unit in a solid-state battery, forms a layer capable of conducting lithium ions or sodium ions between the positive electrode layer and the negative electrode layer. The solid electrolyte may be provided at least between the positive electrode layer and the negative electrode layer. In other words, the solid electrolyte may also be present in the vicinity of the positive electrode layer and/or the negative electrode layer so as to protrude from between the positive electrode layer and the negative electrode layer. Specific examples of the solid electrolyte include a lithium-containing phosphate compound having a NASICON structure, an oxide having a perovskite structure, and an oxide having a garnet type or a garnet type similar structure. Examples of the lithium-containing phosphate compound having a NASICON structure include $Li_xM_y(PO_4)_3$ ($1 \le x \le 2$, $1 \le y \le 2$, and M is at least one selected from the group consisting of Ti, Ge, Al, Ga, and Zr). Examples of the lithium-containing phosphate compound having a NASICON structure include $Li_{1.2}Al_{0.2}Ti_{1.8}(PO_4)_3$. Examples of the oxide having a perovskite structure include $La_{0.55}Li_{0.35}TiO_3$. Examples of the oxide having a garnet-type or garnet-type similar structure include $Li_7La_3Zr_2O_{12}$.

Examples of the solid electrolyte capable of conducting sodium ions include a lithium-containing phosphate compound having a NASICON structure, an oxide having a perovskite structure, and an oxide having a garnet type or a garnet type similar structure. Examples of the lithium-containing phosphate compound having a NASICON structure include $Na_xM_y(PO_4)_3$ ($1 \le x \le 2$, $1 \le y \le 2$, and M is at least one selected from the group consisting of Ti, Ge, Al, Ga, and Zr).

The solid electrolyte layer may contain a sintering auxiliary agent. The sintering auxiliary agent contained in the solid electrolyte layer may be selected from, for example, the same materials as the sintering auxiliary agents that can be contained in the positive electrode layer/negative electrode layer.

(Positive Current Collector Layer and Negative Electrode Current Collector Layer)

The positive electrode layer 110 and the negative electrode layer 120 may include a positive electrode current collector layer and a negative electrode current collector layer, respectively. The positive electrode current collector layer and the negative electrode current collector layer may each have the form of a foil, but may have the form of a sintered body from the viewpoint of diminishing the manufacturing cost of the solid-state battery by integral firing and lowering the internal resistance of the solid-state battery. When the positive electrode current collector layer and the negative electrode current collector layer have the form of a sintered body, these layers may be formed of a sintered body containing a conductive auxiliary agent and a sintered auxiliary agent. The conductive auxiliary agent contained in the positive electrode current collector layer and negative electrode current collector layer may be selected from, for example, the same materials as the conductive auxiliary agents that may be contained in the positive electrode layer and negative electrode layer. The sintered auxiliary agent contained in the positive electrode current collector layer and negative electrode current collector layer may be selected from, for example, the same materials as the sintered auxiliary agents that may be contained in the positive electrode layer and the negative electrode layer. In the solid-state battery, the positive electrode current collector layer and the negative electrode current collector layer are not essential, and a solid-state battery in which such positive electrode current collector layer and negative electrode current collector layer are not provided is also conceivable. In other words, the solid-state battery in the present invention may be a solid-state battery without a current collector layer.

(End Face Electrode)

The solid-state battery is generally provided with an end face electrode 150. In particular, the end face electrode is provided on the side face of the solid-state battery. More specifically, an end face electrode 150A on the positive electrode side connected to the positive electrode layer 110 and an end face electrode 150B on the negative electrode side connected to the negative electrode layer 120 are provided (see FIG. 1). Such end face electrodes preferably contain a material having a high conductivity. The specific material for the end face electrode is not particularly limited, but examples thereof include at least one selected from the group consisting of silver, gold, platinum, aluminum, copper, tin, and nickel.

[Feature of Solid-State Battery of Present Invention]

The solid-state battery of the present invention is a solid-state battery with a substrate. Preferably, such a battery according to the present invention is a packaged solid-state battery. In other words, the solid-state battery has a package structure that contributes to protection from the external environment.

In particular, in the present invention, the solid-state battery is packaged together with peripheral circuits and a support substrate in a state in which the peripheral circuits (preferably circuits for solid-state battery control) are disposed on the support substrate.

Figure 2:
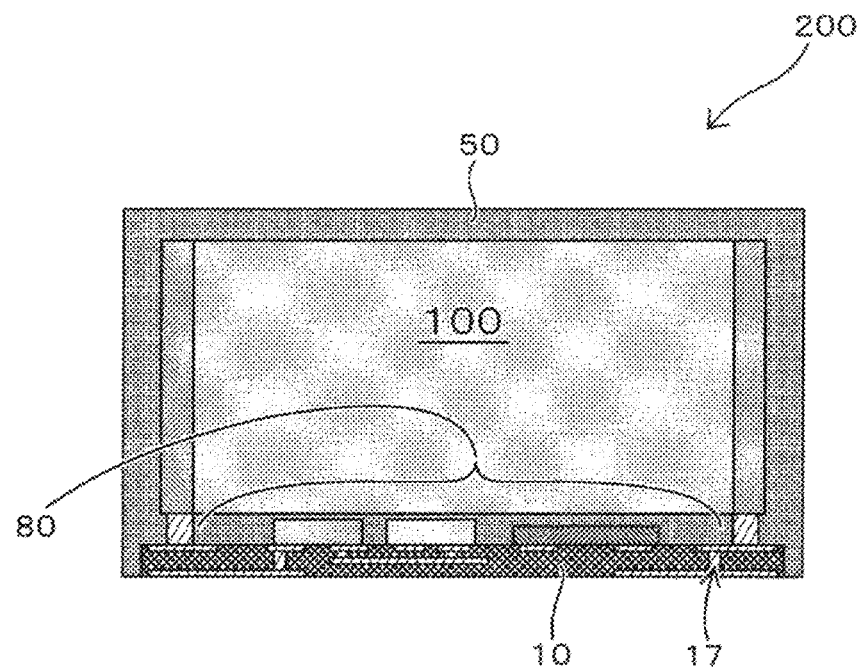
FIG. 2 is a sectional view schematically illustrating the configuration of a solid-state battery according to an embodiment of the present invention.

Specifically, the solid-state battery is mounted on the substrate, and the circuits for the solid-state battery are provided on the substrate. In particular, the circuits are not embedded in the support substrate that supports the solid-state battery, but are disposed on the surface (particularly on the main face) of the substrate. FIG. 2 illustrates the basic configuration of the packaged battery of the present invention. With reference to this drawing, the solid-state battery 100 includes a substrate 10 and a covering member 50, and further integrally includes a circuit 80 on the substrate as a whole.

The circuit 80 is a peripheral circuit for the solid-state battery. The circuit 80 may be any kind of circuit as long as it is a circuit related to the solid-state battery. As an example, the circuit 80 may be a protection circuit and/or a charge and discharge control circuit. In the present invention, the solid-state battery is packaged together with such circuits and the support substrate. As can be seen from the aspect illustrated in FIG. 2, a circuit for the solid-state battery (particularly a circuit for controlling the solid-state battery) is provided on the main face of the substrate 10 and the circuit may extend in the plane direction of the main face of the substrate. In other words, the circuit 80 is disposed on the main face of the substrate 10 so as to be along the direction orthogonal to the laminated direction of the solid-state battery laminate (namely, the laminated direction of the electrode layers of the solid-state battery). In short, the circuit is provided so as to stick to the main face of the substrate. As the circuit is provided in this way, the main face of the substrate 10 can be more effectively used as the battery control face. Since the circuit and the solid-state battery are close to each other on the substrate, the heat from such a circuit on the substrate is easily transmitted to the solid-state battery, and the effect that the charge efficiency of the battery may be improved by the heat may also be exerted. The "main face" as used in the present invention refers to a face having a normal line in the laminated direction of the electrode layers in the solid-state battery.

As illustrated in the drawing, in the package product according to the present invention, the substrate 10 and the covering member 50 are provided in the vicinity of the solid-state battery 100 so as to totally surround the solid-state battery 100 (so that all the faces forming the solid-state battery are not exposed to the outside). Because of such a sealing form, in the present invention, the solid-state battery is preferably packaged to contribute to the prevention of water vapor transmission. In particular, water vapor transmission is prevented by a form in which the circuit for the solid-state battery is provided on the substrate as a package product.

As can be seen from the form illustrated in FIG. 2, the substrate 10 is a substrate that supports at least the solid-state battery 100. The substrate is positioned to be proximal to one side that forms the main face of the solid-state battery to be used for such "support". The main face size of the substrate may be larger than the main face size of the solid-state battery rather than the same as the main face size of the solid-state battery. The substrate is a "substrate", and thus preferably has a thin plate-like shape as a whole.

In the present invention, the substrate 10 supports not only the solid-state battery 100 but also the circuit 80 on the surface of the substrate (see FIG. 2). In other words, the substrate 10 in the present invention is a substrate that supports both the solid-state battery 100 and the circuit 80. Because of this aspect, a substrate 20 can also be referred to as a "support substrate" (hereinafter, the substrate will be appropriately referred to as a "support substrate").

The substrate 10 may be a resin substrate or a ceramic substrate. The substrate 10 may not be a silicon substrate in particular. In a certain suitable aspect, the substrate 10 is a ceramic substrate. In other words, the substrate 10 contains ceramic, which occupies the base material component of the substrate. A support substrate formed of ceramic is a substrate that contributes to the prevention of water vapor transmission and is thus preferable from the viewpoint of heat resistance in mounting as well. Such a ceramic rack substrate can be obtained through firing, for example, by firing a green sheet laminate. Regarding this, the ceramic substrate may be, for example, a Low Temperature Co-fired Ceramic (LTCC) substrate or a High Temperature Co-fired Ceramic (HTCC) substrate. Although it is merely an example, the thickness of the substrate may be 20 μm or more and 1000 μm or less and is, for example, 100 μm or more and 300 μm or less.

Figure 3:
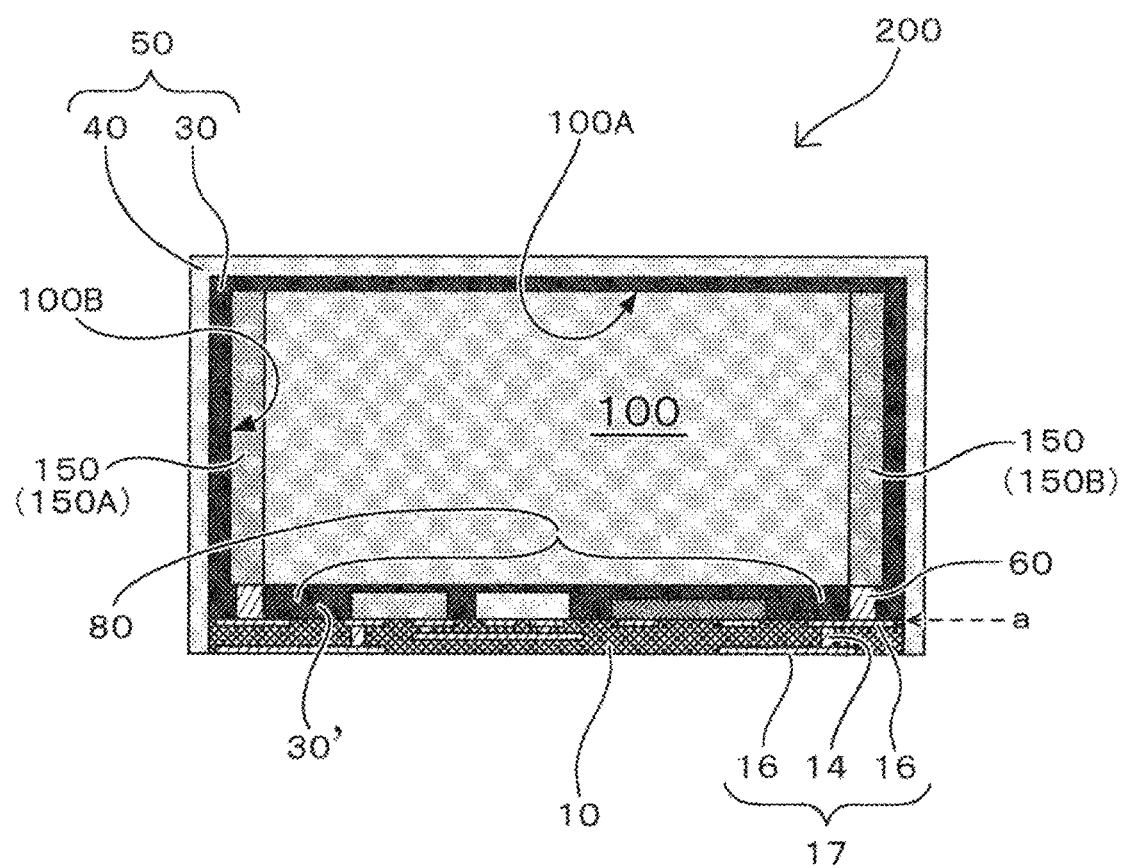
FIG. 3 is a sectional view schematically illustrating the configuration of a solid-state battery according to another embodiment (a covering member including a covering insulation film and a covering inorganic film) of the present invention.

The covering member 50 is preferably provided so as to cover the top face and side face of the solid-state battery on the substrate 10 so as to be used for sealing. As illustrated in FIG. 2, the covering member 50 may be provided so as to exceed the side face of the solid-state battery. From the viewpoint of more suitable sealing, it is preferable that the covering member 50 is formed of a covering insulation layer 30 and a covering inorganic film 40 as illustrated in FIG. 3. For example, it is preferable that the covering insulation layer 30 is provided so as to cover the top face and side face of the solid-state battery 100 and the covering inorganic film 40 is provided on the covering insulation layer. This is because particularly the property of preventing water vapor transmission may be effectively improved.

In other words, the covering member 50 is preferably a layer provided so as to cover at least a top face 100A and a side face 100B of the solid-state battery 100. As illustrated in FIG. 3, the solid-state battery 100 provided on the support substrate 10 is largely wrapped by the covering member 50 as a whole. In a certain suitable aspect, the covering member 50 is provided in the whole battery face region on the top face 100A and side face 100B of the solid-state battery 100 (at least the whole battery "top face" region and the whole battery "side face" region), and the covering member 50 is provided so as to exceed the battery side face and extend toward the substrate side in sectional view as illustrated in the drawing.

As can be seen from the above description, the term "top face" as used in the present specification means a face that is positioned relatively at the upper side of the face that constitutes the battery. Assuming a typical solid-state battery with two opposing main faces, the term "top face" as used in the present specification refers to one of the main faces, and particularly means a main face different from the main face proximal to the support substrate (namely, the mounting face side in the SMD type battery described later). Hence, the term "provided so as to cover the top face and side face of the solid-state battery" as used in the present invention substantially means that at least the covering member is provided on the battery face other than the face/face region that comes into contact with the plane in the case of assuming that the solid-state battery is placed on a plane.

The covering insulation layer 30 of the covering member 50 preferably corresponds to a resin layer. In other words, it is preferable that the covering insulation layer 30 contains a resin material, which forms a base material of the layer. As can be seen from the illustrated aspect, this means that the solid-state battery provided on the support substrate 10 is sealed with the resin material of the covering insulation layer 30. Such a covering insulation layer 30 formed of a resin material contributes to a suitable water vapor barrier in combination with the covering inorganic film 40.

The material for the covering insulation layer 30 may be any kind as long as it exhibits insulating properties. For example, when the covering insulation layer contains a resin, the resin may be either a thermosetting resin or a thermoplastic resin. Although not particularly limited, examples of the specific resin material for the covering insulation layer include an epoxy-based resin, a silicone-based resin, and a liquid crystal polymer. Although it is merely an example, the thickness of the covering insulation layer may be 30 μm or more and 1000 μm or less and is, for example, 50 μm or more and 300 μm or less.

The covering inorganic film 40 of the covering member 50 is preferably provided so as to cover the covering insulation layer 30. In such a case, the covering inorganic film 40 is positioned on the covering insulation layer 30, and thus has a form to largely wrap the solid-state battery 100 on the support substrate 10 as a whole together with the covering insulation layer 30.

The covering inorganic film 40 preferably has a thin film form. Hence, in the covering member 50, the thickness of the covering inorganic film 40 is thinner than the thickness of the covering insulation layer 30. The material for the covering inorganic film 40 is not particularly limited as long as it contributes to the inorganic layer having a thin film form, and may be any of a metal, glass, oxide ceramic, or a mixture thereof. In a certain suitable aspect, the covering inorganic film 40 contains a metal component. In other words, the covering inorganic film 40 is preferably a metal thin film. Although it is merely an example, the thickness of the covering inorganic film may be 0.1 μm or more and 100 μm or less and is, for example, 1 μm or more and 50 μm or less.

The covering inorganic film 40 having a thin film form may be a plating film. The covering inorganic film 40 may be a dry plating film particularly depending on the manufacturing method. Such a dry plating film is a film obtained by vapor deposition such as physical vapor deposition (PVD) or chemical vapor deposition (CVD), and has a significantly thin thickness of a nano or micron order. Such a thin dry plating film contributes to more compact packaging. For example, the dry plating film may be formed of at least one metal component/metalloid component selected from the group consisting of aluminum (Al), nickel (Ni), palladium (Pd), silver (Ag), tin (Sn), gold (Au), copper (Cu), titanium (Ti), platinum (Pt), silicon (Si), and SUS, an inorganic oxide, and/or a glass component. The dry plating film formed of such components is chemically and/or thermally stable, and thus a solid-state battery exhibiting excellent chemical resistance, weather resistance, and/or heat resistance and improved long-term reliability may be obtained. As can be seen from the materials exemplified above, the covering inorganic film 40 may not be formed of tantalum.

In the present invention, the solid-state battery is packaged by being configured to be wrapped with the substrate and the covering member. In particular, it is preferable that the solid-state battery is packaged so as to be suitable for surface mounting and the substrate is a terminal substrate. It can be said that the support substrate is preferably a terminal substrate. This means that a substrate according to a certain suitable aspect forms the support substrate for the solid-state battery and peripheral circuits as well as a terminal substrate for the external terminals of the packaged solid-state battery.

In a solid-state battery including a support substrate as a terminal substrate, the solid-state battery can be mounted on another secondary substrate such as a printed wiring board and/or a motherboard in the form of interposing the substrate. For example, a solid-state battery including a support substrate that can be used as a terminal substrate may be mounted on printed wiring boards provided with electronic parts and/or ICs and/or external substrates such as motherboards.

For example, the solid-state battery can be mounted on a surface with a support substrate interposed therebetween through solder reflow or the like. From such a fact, it can be said that the packaged solid-state battery of the present invention is an SMD type battery (namely, a surface mount product). In particular, when the terminal substrate is formed of a ceramic substrate, the solid-state battery of the present invention can be an SMD type battery which exhibits high heat resistance and is solder mountable.

The support substrate is a terminal substrate, and thus it is preferable that the substrate has wiring, in particular, it is preferable that the substrate is provided with wiring for electrically connecting the upper and lower surfaces/upper and lower surface layers. In other words, the support substrate of a certain suitable aspect is provided with wiring for electrically connecting the upper and lower faces of the substrate and serves as a terminal substrate for the external terminals of the packaged solid-state battery. In short, the solid-state battery and the support substrate that supports circuits may have a connecting conductive portion that electrically connects both main faces of the substrate to each other. In such an aspect, the wiring of the support substrate can be used for taking out from the solid-state battery to the external terminal, it is thus not required to take out of the package while packing with a water vapor barrier layer using a metal tag, and the degree of freedom in designing external terminals is high. The wiring on the terminal substrate is not particularly limited, and may have any form as long as it contributes to the electrical connection between the upper face and lower face of the substrate. The wiring contributes to electrical connection, and thus it can be said that the wiring on the terminal substrate is the conductive portion 17 of the substrate (see FIG. 2 or FIG. 3). Such a conductive portion of the substrate may have a form such as a wiring layer, vias, and/or lands. For example, in the form illustrated in FIG. 3, the support substrate 10 is provided with vias 14 and/or lands 16. The "via" as used herein refers to a member for electrically connecting the vertical direction/substrate thickness direction of the support substrate, and is preferably, for example, a filled via, or may be in the form of an inner via. The term "land" as used herein refers to a terminal portion/connection portion (preferably the terminal portion/connection portion connected to the via) for electrical connection provided on the upper side main face and/or lower side main face of the support substrate, and may be, for example, a corner land or a round land.

In the terminal substrate having the conductive portion 17, the pull-out position of the external terminal as a battery package product can be arbitrarily provided at the lower part of the package. As can be seen from the forms illustrated in FIG. 2 and FIG. 3, the pull-out shape of such an external terminal can be provided as a smooth plane in the same plane as the mount package without substantially unevenness. In a solid-state battery provided with such a substrate, the terminals can be taken out of the package at a relatively short distance (preferably the shortest distance) from the battery, and thus a battery package product with low loss may be obtained.

In the terminal substrate of the present invention, the opposing upper face and the lower face are electrically connected to each other. Hence, the kind of terminal substrate is not particularly limited as long as it is such a substrate. For example, as the terminal substrate, a substrate that can be connected up and down and contributes to component mounting may be used. Although it is merely an example, an interposer in which the upper face and the lower face are electrically connected to each other may be used (in such a case, the substrate material for the interposer may not be particularly silicon but may be ceramic).

In a solid-state battery including a support substrate as a terminal substrate, the wiring of the support substrate and the terminal portion of the solid-state battery are electrically connected to each other. In other words, the conductive portion of the support substrate and the end face electrode of the solid-state battery are electrically connected to each other. For example, while the end face electrode on the positive electrode side of the solid-state battery is electrically connected to the conductive portion on the positive electrode side of the support substrate, the end face electrode on the negative electrode side of the solid-state battery is electrically connected to the conductive portion on the negative electrode side of the support substrate. This makes it possible to provide the conductive portions on the positive electrode side and negative electrode side (particularly lower side land/bottom face land) of the support substrate as the positive electrode terminal and negative electrode terminal of the solid-state battery package product, respectively.

In the present invention, a member that contributes to a suitable electrical connection between the terminal substrate and the solid-state battery may be provided. For example, the solid-state battery of the present invention may further include a conductive connecting member 60 that electrically connects the end face electrode 150 and the conductive portion 17 to each other on the substrate (see FIG. 3). The conductive connecting member 60 may be formed using a paste that contains at least one selected from the group consisting of silver (Ag), copper (Cu), palladium (Pd), gold (Au), platinum (Pt), aluminum (Al), and nickel (Ni).

As can be seen from the aspect illustrated in FIG. 3, the circuit 80 is positioned in the "gap between the solid-state battery 100 and the substrate 10" formed by the conductive connecting member 60 (namely, the conductive connecting member 60 that electrically connects the end face electrode 150 of the solid-state battery and the conductive portion 17 such as the wiring of the substrate). In such a case, the gap caused by the conductive connecting member 60 can be effectively used as an installation space for the circuit 80, and this can thus contribute to the decrease in height of the solid-state battery.

The solid-state battery 100 of the present invention has at least a feature of being packaged together with the circuit 80 using the substrate 10. In other words, in the present invention, active elements, passive elements, auxiliary elements and/or the like that constitute the circuits for the solid-state battery may be packaged by being disposed on the substrate together with the solid-state battery. Examples of the active elements include at least one selected from the group consisting of a transistor, an IC, a diode, an operational amplifier and the like. Examples of the passive elements include at least one selected from the group consisting of a resistor, a coil, a capacitor and the like. Examples of the auxiliary elements include at least one selected from the group consisting of a connector, a terminal, wiring, a wire rod and the like. Such circuit elements may have a chip form.

For example, circuit elements used for battery peripheral circuits such as protection circuits and/or charge and discharge control circuits are packaged together with the solid-state battery. In other words, protective circuit elements for preventing charge of the solid-state battery at the time of overcharge, preventing discharge at the time of overdischarge, and/or stopping large current discharge at the time of short-circuiting and the like and/or charge and discharge control circuit elements for controlling charge and/or discharge of the solid-state battery are integrally packaged together with the solid-state battery. In short, in the present invention, the circuit provided on the substrate may be a circuit for controlling the solid-state battery. As illustrated in FIG. 2 and FIG. 3, such a circuit 80 may be in contact with the main face of the substrate 10 but not in contact with the solid-state battery 100 itself. This makes it possible to suppress an inconvenient phenomenon caused by physical contact between the battery and the circuit.

Broadly speaking, in the present invention, at least one battery peripheral circuit selected from the group consisting of a protection circuit, a charge control circuit, a temperature control circuit, an output compensation circuit, and an output stabilized power supply circuit may be packaged with the solid-state battery.

Figure 4A:
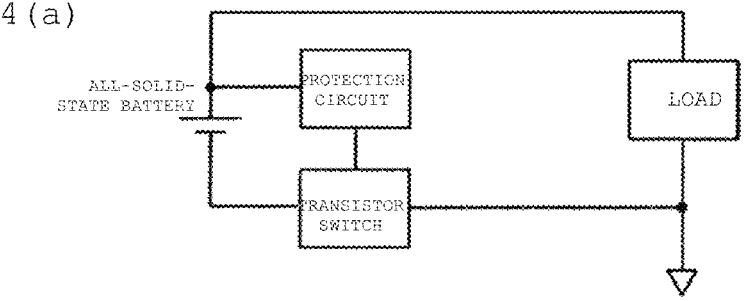
FIGS. 4(a) to 4(d) are circuit diagrams of battery peripheral circuits provided on a substrate (FIG. 4(a): protection circuit, FIG. 4(b): charge control circuit, FIG. 4(c): temperature control circuit, and FIG. 4(d): output compensation circuit).

When the battery peripheral circuit is a protection circuit, it is possible to prevent overdischarge, overcharge, overcurrent, and/or overheating of the solid-state battery. FIG. 4(a) illustrates an example of a circuit diagram when the circuit provided on the substrate serves as a protection circuit. Although it is merely an illustration, the protection circuit is controlled so that a predetermined voltage or current does not become excessive.

Figure 4B:
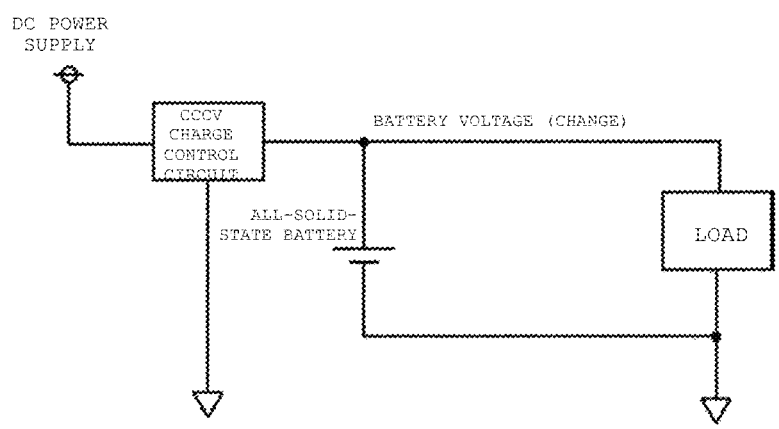

When the battery peripheral circuit is a charge control circuit, it is possible to control the charge of the solid-state battery. FIG. 4(b) illustrates an example of a circuit diagram when the circuit provided on the substrate serves as a charge control circuit. Although it is merely an illustration, the charge control circuit controls so that the desired constant current and constant voltage (CCCV) charge is performed.

Figure 4C:
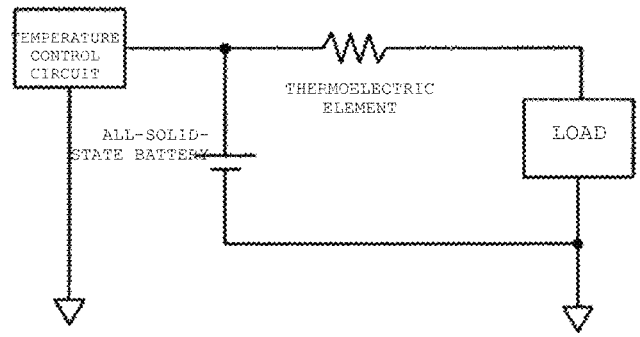

When the battery peripheral circuit is a temperature control circuit, the solid-state battery can be controlled to an appropriate temperature so that the charge and discharge efficiency is improved. FIG. 4(c) illustrates an example of a circuit diagram when the circuit provided on the substrate serves as a temperature control circuit. Although it is merely an illustration, when the temperature of the solid-state battery is controlled by the temperature control circuit, the temperature of the solid-state battery is detected by a temperature detecting means such as a thermocouple or a thermistor, and electric power may be supplied to the thermoelectric element via the temperature control circuit based on the temperature information thus acquired to heat and/or cool the battery.

Figure 4D:
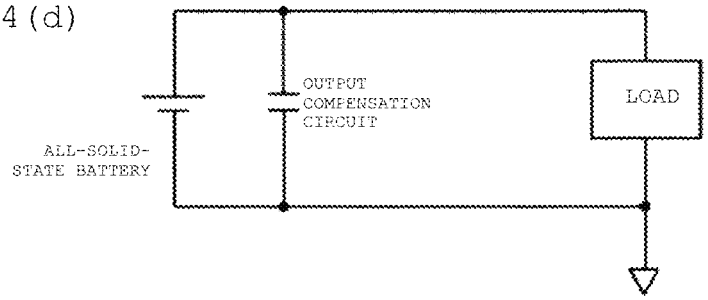

When the battery peripheral circuit is an output compensation circuit, the internal impedance of the solid-state battery can be suppressed to a low level, and the decrease in the battery voltage can be mitigated. FIG. 4(d) illustrates an example of a circuit diagram when the circuit provided on the substrate serves as an output compensation circuit.

Figure 5A:
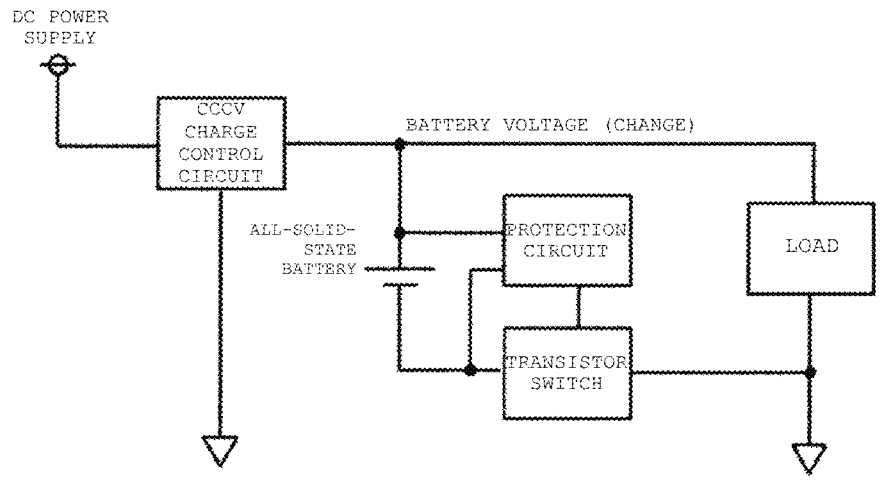
FIGS. 5(a) to 5(c) are circuit diagrams in which a plurality of battery peripheral circuits provided on a substrate are combined together (FIG. 5(a): charge control/protection circuits, FIG. 5(b): charge control/protection/output stabilized power supply circuits, FIG. 5(c): charge control/protection/output stabilized power supply/output compensation circuits).
Figure 5B:
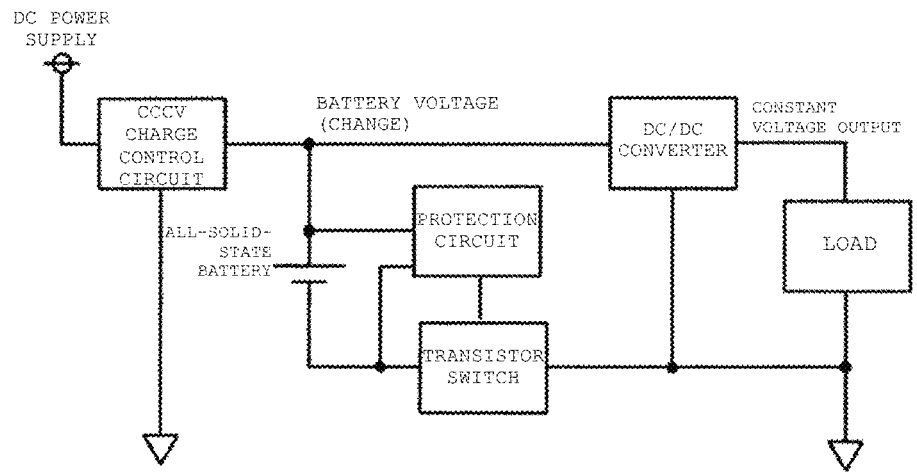
Figure 5C:
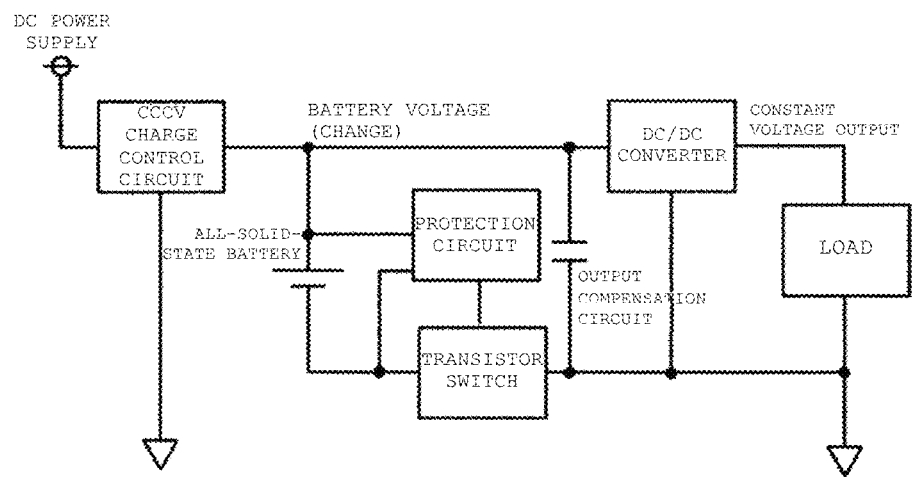

The circuits may be provided so as to have a single function, but may be provided in combination so as to have a plurality of functions. For example, by providing a plurality of subcircuits in combination, the properties of the respective circuits can be imparted for the control of the solid-state battery. As an illustrated aspect, FIG. 5A illustrates the combination of a charge control circuit and a protection circuit, FIG. 5B illustrates the combination of a charge control circuit, a protection circuit, and an output stabilized power supply circuit, and FIG. 5C illustrates a combination of a charge control circuit, a protection circuit, an output stabilized power supply circuit, and an output compensation circuit. The output stabilized power supply circuit may have a built-in DC-DC converter.

In the package product according to the present invention, the circuit 80 is provided on the substrate 10 that supports the solid-state battery 100. In other words, the circuit dedicated to the solid-state battery is disposed not inside the substrate constituting the solid-state battery package (namely, the "battery package substrate") but on the surface of the substrate. The circuit may be provided on the battery package substrate, and thus, the circuit is not particularly limited to the form illustrated in FIG. 3 and may have the forms illustrated in FIG. 6A and FIG. 6B.

Figure 6A:
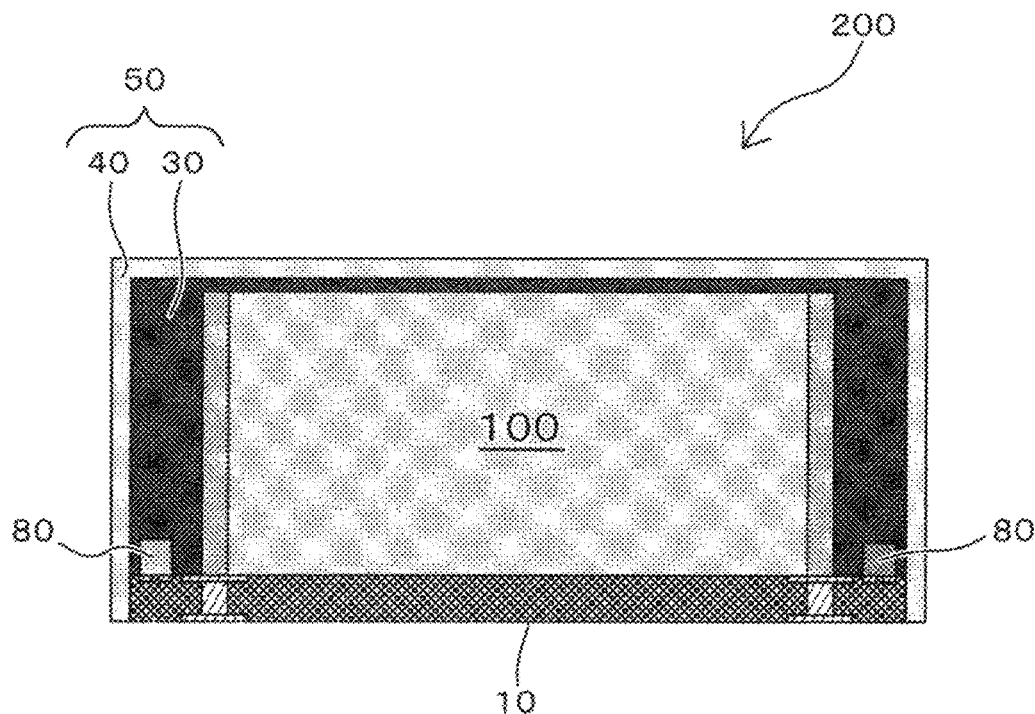
FIG. 6A is a schematic sectional view for explaining an aspect in which a circuit is provided on a substrate side by side with a solid-state battery.
Figure 6B:
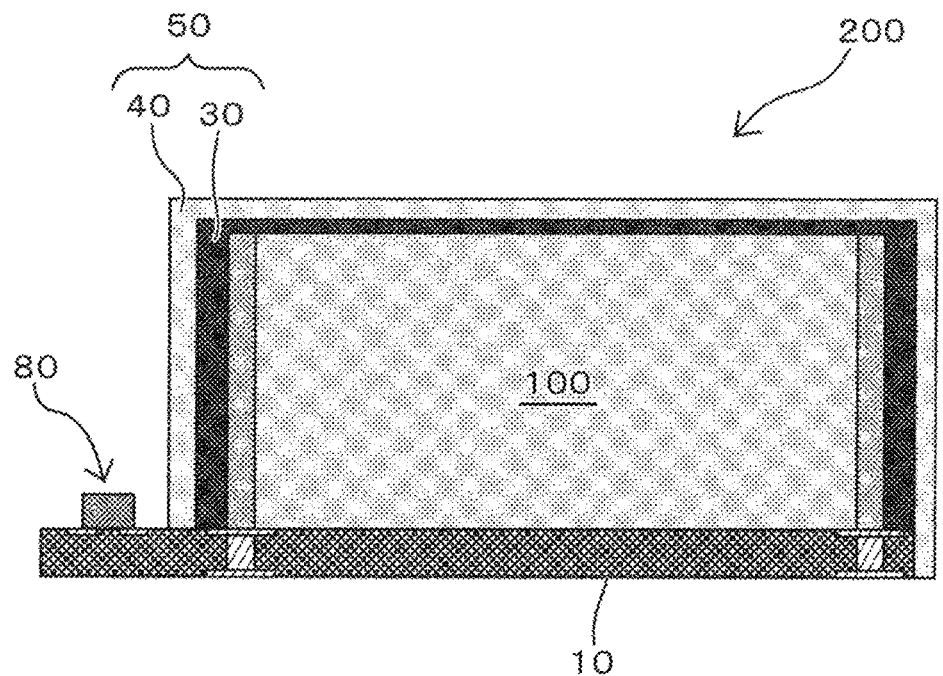
FIG. 6B is a schematic sectional view for explaining an aspect in which a circuit is provided on a substrate side by side with a solid-state battery.

In the form illustrated in FIG. 3, the circuit 80 is positioned between the substrate 10 and the solid-state battery 100. In other words, the solid-state battery provided on the substrate has a gap between the lower side face thereof and the substrate, and a circuit is provided in this gap. In FIG. 6A and FIG. 6B, the circuit 80 is provided not between the substrate 10 and the solid-state battery 100 but on the surface of the substrate 10 side by side with the solid-state battery 100. In other words, a circuit is provided on the main face of the substrate on which the solid-state battery is provided in the non-battery installation region that does not overlap the solid-state battery.

In the present invention, the solid-state battery and the peripheral circuit dedicated to the battery are integrated with the same substrate interposed therebetween. As illustrated in FIG. 3 and FIGS. 6A and 6B, since the substrate is the same substrate, the dedicated circuit and the solid-state battery are disposed on the substrate to be adjacent to each other. The term "disposed to be adjacent to each other" as used herein means that the circuit and the solid-state battery have a close positional relation in a broad sense, and means that the circuit is disposed on the substrate so as to be directly below or directly beside the solid-state battery in a narrow sense. As can be seen from the illustrated form, although the circuit is provided as a package product, the size of the package product as a whole is not unnecessarily large. In other words, in the present invention, the package product is a compact solid-state battery package product, and a more suitable SMD (surface mount device) is obtained.

In a more specific aspect, as a circuit for controlling the solid-state battery, various electronic parts such as ICs and/or other chip parts, wiring and the like may be provided. For example, various electronic parts 80 represented by ICs and/or other chip parts for protection circuits and/or charge and discharge control circuits, wiring and the like are provided on the main face of the substrate to be adjacent to the solid-state battery 100.

Here, the fact that the circuit includes an IC and the like means that the effect of utilizing heat generation may be exerted in addition to the control effect by the circuit. The chip parts and the like of the circuit may generate heat, and the present invention can effectively utilize the heat. Specifically, since the circuit and the solid-state battery are disposed on the substrate to be adjacent to each other, the heat from such a circuit on the substrate is easily transmitted to the solid-state battery, and the effect that the charge efficiency of the battery may be improved by the heat may also be exerted.

The respective forms of FIG. 3 and FIGS. 6A and 6B will be described in detail.

In the form illustrated in FIG. 3, the circuit 80 is positioned in the gap portion between the substrate 10 and the solid-state battery 100. As described above, in the solid-state battery of the present invention, the conductive connecting portion 60 for electrically connecting the end face electrode 150 and the conductive portion 17 to each other is preferably provided, but the circuit 80 is positioned in the gap portion formed by the conductive connecting portion 60. The circuit is provided in the region where the solid-state battery and the support substrate overlap each other, and thus this is likely to contribute particularly to the realization of a compact battery package product and the package product does not become bulky by the presence of electronic parts, wiring and the like for the circuit.

With regard to the compact battery package product, the size of the substrate in plan view (the size of the main face of the substrate on which the battery is mounted) is approximately the same as the size of the solid-state battery in plan view (the size of the main face of the battery), but is preferably larger than this. It is preferable that the size of the substrate in plan view is larger than the circuit size. For example, it may be 1.1×S2<S1<1.5×S2, and thus, it may be 1.1×S2<S1<1.4×S2, 1.1×S2<S1<1.3×S2, 1.1×S2<S1<1.2×S2, or the like, where S1 denotes the size of the substrate in plan view and S2 denotes the size of the solid-state battery in plan view.

When the size of the substrate in plan view is larger than the size of the solid-state battery in plan view, not only it is preferable from the viewpoint of supporting the solid-state battery and the circuit but also the main face of the substrate may become large and the degree of freedom in designing the circuit may increase.

In the aspect illustrated in FIG. 3, the circuit 80 is provided on the main face of the substrate 10 to be directly below the solid-state battery 100, and thus the solid-state battery 100 and the circuit 80 are particularly close to each other. Hence, the heat from the circuit is likely to be efficiently transmitted to the solid-state battery, and the effect that the charge efficiency of the solid-state battery may be improved is likely to be particularly exerted.

The conductive connecting member 60 between the substrate and the solid-state battery not only contributes to the mutual electrical connection between the solid-state battery and the substrate (particularly the terminal substrate), but also contributes to the formation of a gap for circuit installation provided between the solid-state battery and the substrate. Hence, the conductive connecting member forms a spacer, and thus such a connecting member corresponds to the conductive spacer. In other words, in a suitable aspect of the present invention, it can be said that a conductive spacer is provided between the substrate and the solid-state battery. The conductive spacer is, for example, a member containing a metal component. Examples of such a metal component include a metal component selected from the group consisting of silver (Ag), copper (Cu), palladium (Pd), gold (Au), platinum (Pt), aluminum (Al), nickel (Ni), and the like.

The conductive spacer may be formed of a single part or may be formed of at least two parts. For example, the conductive spacer may have a non-cleaning type member (hereinafter, also referred to as "non-cleaning type bonding material") that does not require flux cleaning in soldering. In particular, at least a part of the conductive spacer may be a non-cleaning type bonding material.

With regard to this, the portion in direct contact with the solid-state battery may contain a non-cleaning type bonding material. The non-cleaning type bonding material is provided by the packaging process. Specifically, the non-cleaning type bonding material can be provided by mounting the solid-state battery on the substrate without performing flux cleaning after the circuit is provided on the substrate.

In the package product according to the present invention, a resin material may be provided between the substrate and the solid-state battery. In other words, the resin material may be provided in the "gap between the solid-state battery and the support substrate" formed by the interposition of the conductive connecting member such as the conductive spacer. In particular, in the aspect illustrated in FIG. 3, the resin material 30' may be provided so as to fill the gap portion except for the circuit between the substrate and the solid-state battery. For example, in sectional view as illustrated in FIG. 3, the resin material 30' may be provided on the inner side of the conductive connecting portion 60 so as to fill the gap between the substrate 10 and the solid-state battery 100. As can be seen from the illustrated form, the resin material 30' filling the gap between the substrate 10 and the solid-state battery 100 is positioned on the inner side of the covering inorganic film 40.

The resin material may be either a thermosetting resin material or a thermoplastic resin material. Although not particularly limited, examples of the resin material include an epoxy-based resin, a silicone-based resin, and a liquid crystal polymer similar to those for the covering insulation layer. Regarding this, the resin material between the substrate and the solid-state battery may be provided integrally with the above-mentioned covering member (particularly, the covering insulation layer). In other words, the covering insulation layer 30' is provided not only on the top face and side face of the solid-state battery 100, but may also be provided in a gap positioned between the bottom face of the solid-state battery 100 and the top face of the support substrate 10. Such a resin material may function as a protective material that suitably protects the circuit between the substrate and the solid-state battery in the package product according to the present invention. When the gap between the substrate and the solid-state battery is filled with a resin material, the reliability of the circuit may also be improved by the insulating effect of the resin material. Hence, such a resin material can also be referred to as a circuit protective material.

In the forms illustrated in FIG. 6A and FIG. 6B, the circuit is provided not on the gap between the substrate and the solid-state battery but on the substrate other than the gap. The circuit is provided in the substrate region deviated from the battery installation region on the main face of the substrate on which the solid-state battery is installed.

In the forms illustrated in FIG. 6A and FIG. 6B, peripheral circuits dedicated to the solid-state battery are provided on the same substrate as in the form of FIG. 3, but not in the gap between the solid-state battery and the substrate, and it is thus easy to decrease the dimension in the height direction of the package product as a whole.

In FIG. 6A, the circuit 80 for the solid-state battery is covered with the covering member 50.

More specifically, various electronic parts such as ICs and chip parts used in the circuit 80, and the like are covered with the covering member 50. In particular, a form is preferable in which such various electronic parts of the circuit 80 are covered with the covering insulation layer 30 of the covering member 50. On the other hand, in FIG. 6B, the circuit 80 for the solid-state battery is not covered with the covering member 50. More specifically, various electronic parts such as ICs and chip parts used in the circuit 80 provided on the substrate, and the like are not covered with the covering member 50. When the viewpoint of sealing is more important, it is preferable that the circuit 80 is covered with the covering member 50 as illustrated in FIG. 6A, but this may not be suitable for sealing with the covering insulation layer 30 depending on the size of the electronic part used in the circuit. This is because when a large-sized electronic part is covered with the covering insulation layer 30, the thickness of the covering insulation layer 30 is inevitably increased, and the sealing portion becomes large. In the aspect illustrated in FIG. 6B, the circuit may be individually sealed with another covering member different from the covering member that seals the solid-state battery.

As described above, the present invention has a feature that the solid-state battery is packaged together with the circuit thereof, but the present invention also has a feature in the prevention of water vapor transmission. This will also be described in detail below.

The solid-state battery of the present invention is packaged by a support substrate, a covering insulation layer, and a covering inorganic film, and is thus a battery exhibiting particularly excellent water vapor transmission preventing property. In other words, in the battery package product according to the present invention, deterioration in battery properties due to water vapor (more specifically, a phenomenon that water vapor in the external environment is mixed in and the properties of the solid-state battery deteriorate) is more reliably prevented at least by the covering insulation layer and the covering inorganic film which cover the top face and side face of the solid-state battery on the support substrate. In other words, the covering insulation layer and the covering inorganic film are preferably provided as a package layer that prevents the invasion of water vapor in the external environment around the solid-state battery rather than the intent of a barrier for the internal components of the solid-state battery.

Preferably, the covering inorganic film is a water vapor barrier film. In other words, the covering inorganic film covers the top face and side face of the solid-state battery so as to be preferably used as a barrier to block moisture from entering the solid-state battery. Preferably, the covering inorganic film may extend so as to exceed the main face of the substrate (namely, the substrate face on which the circuit is provided) as in the sectional view illustrated. The covering inorganic film is thus used as a more suitable water vapor barrier for the circuit on the main face of the substrate. The term "barrier" as used in the present specification means to exhibit water vapor transmission blocking property that does not allow water vapor in the external environment to pass through the covering inorganic film and cause inconvenient deterioration in properties of the solid-state battery in a broad sense, and means that the water vapor transmission rate is less than $1.0 \times 10^{-3}$ g/(m²·Day) in a narrow sense. Hence, in short, it can be said that the water vapor barrier film preferably has a water vapor transmission rate of 0 or more and less than $1.0 \times 10^{-3}$ g/(m²·Day). The term "water vapor transmission rate" as used herein refers to the transmission rate acquired using the gas transmission rate measuring instrument of model GTms-1 manufactured by ADVANCE RIKO, Inc. under the measurement conditions of 40° C., 90% RH, and a differential pressure of 1 atm. The present invention according to a certain suitable aspect is a battery package product including a support substrate, an all-solid-state battery, a non-conductive material, and a water vapor barrier layer, and is, in particular, a battery package product in which electronic parts such as capacitors, resistors, and ICs of peripheral circuits are housed on the inner side of the water vapor barrier layer.

The covering insulation layer and the covering inorganic film may be integrated with each other. Hence, the covering inorganic film forms a water vapor barrier for the solid-state battery together with the covering insulation layer.

In other words, the invasion of water vapor in the external environment into the solid-state battery is more suitably prevented by the combination of the integrated covering insulation layer and covering inorganic film. In other words, it can be said that the covering inorganic film is a water vapor barrier layer in combination with the covering insulation layer and the covering insulation layer is also a water vapor barrier in combination with the covering inorganic film.

In the present invention, the support substrate that supports the solid-state battery is positioned so as to cover the lower side (bottom side) of the solid-state battery, and thus contributes to the prevention of water vapor transmission from this lower side (bottom side). In other words, the support substrate is preferably a water vapor barrier substrate. The term "barrier" as used herein has the same meaning as above, and means to exhibit water vapor transmission blocking property that does not allow water vapor in the external environment to pass through the covering inorganic film and cause inconvenient deterioration in properties of the solid-state battery in a broad sense, and means that the water vapor transmission rate of the substrate is less than $1.0 \times 10^{-3}$ g/(m²·Day) in a narrow sense. Hence, the water vapor barrier substrate preferably has a water vapor transmission rate of 0 or more and less than $1.0 \times 10^{-3}$ g/(m²·Day). In this way, when the support substrate is a water vapor barrier substrate, the barrier effect is exerted by the substrate itself, and thus an aspect is also conceivable in which the covering inorganic film is not provided on the bottom face side of the substrate. In other words, an aspect is also conceivable in which the covering inorganic film is provided so as to largely wrap the solid-state battery but is not provided on a part (specifically, the bottom face) of the support substrate (that is, in a certain suitable aspect, the covering inorganic film may be provided on most faces of the battery package product, but may not be provided on all faces).

When the support substrate is a ceramic substrate, the effect of preventing water vapor transmission of the support substrate is likely to be exerted. When the support substrate exhibits water vapor barrier property, while water vapor transmission from the upper side and lateral side of the solid-state battery may be prevented mainly by the covering insulation layer and covering inorganic film, water vapor transmission from the lower side (bottom side) of the solid-state battery may be prevented mainly by the support substrate. Considering that the support substrate is preferably a terminal substrate, it can be said that the prevention of water vapor transmission from the lower side (bottom side) of the solid-state battery is mainly performed by the terminal substrate. As can be seen from the aspect illustrated in FIG. 3, water vapor transmission from the lower side (bottom side) may be prevented not only by the support substrate 10 but also by the combination with the covering insulation layer 30' provided on the upper face thereof.

From another perspective, for example, as can be seen from the aspect illustrated in FIG. 3, the end face electrode 150 of the solid-state battery 100 is surrounded by the combination of the covering insulation layer 30, the covering inorganic film 40, and the support substrate 10. In other words, it can be said that the periphery of the end face electrode 150 of the solid-state battery 100 is sealed so as to be wrapped by the combination of these three members. Hence, the possibility that water vapor in the external environment enters from the end face electrode 150 of the solid-state battery 100 is more reliably prevented. Such sealing may be particularly advantageous when the end face electrodes of the solid-state battery are formed of a sintered metal system. This is because such an end face electrode may have pores/defects and the like depending on the material, form, manufacturing process, and the like and may not always be sufficient for water vapor transmission in the air.

Even when the support substrate is a resin substrate, the support substrate may be a water vapor barrier substrate. It is conceivable that the resin substrate itself forms a water vapor barrier substrate. For example, by providing a metal layer (although it is merely an example, a metal foil such as a copper foil) on the resin substrate, the effect of preventing water vapor transmission of the substrate can be further enhanced. Hence, in such an aspect, the resin substrate may be more suitable as the water vapor barrier substrate of the battery package product.

A certain aspect has a form in which the solid-state battery on the support substrate is covered with the covering inorganic film with the covering insulation layer interposed therebetween, and thus the covering insulation layer can also act as a buffer material. Specifically, when expansion and contraction of the solid-state battery due to charge and discharge, thermal expansion and the like occurs as well, the influence thereof is not directly exerted on the covering inorganic film, and the influence may be mitigated by the buffer effect due to the interposition of the covering insulation layer. Hence, the occurrence of cracking and the like may be diminished in the case of a thin film such as a covering inorganic film as well, and a more suitable water vapor barrier may be provided. This may be said particularly when the covering insulation layer contains a resin material, and such a buffer effect may increase in a covering insulation layer formed of a resin material.

The covering insulation layer may have an elastic modulus that more effectively suppresses the influence of expansion and contraction of the solid-state battery. In other words, in order to diminish the occurrence of cracking and the like due to the expansion and contraction of the solid-state battery, a covering insulation layer exhibiting a relatively low elastic modulus may be provided. For example, the elastic modulus of the covering insulation layer may be 1 MPa or less, more specifically 0.5 MPa or less or 0.1 MPa or less. The lower limit value of the elastic modulus is not particularly limited and is, for example, 10 Pa. The "elastic modulus" as used herein refers to the so-called Young's modulus [Pa].

The value thereof means a value acquired by the method conforming to the JIS standard (JIS K 7161, JIS K 7181, or the like).

Figure 7:
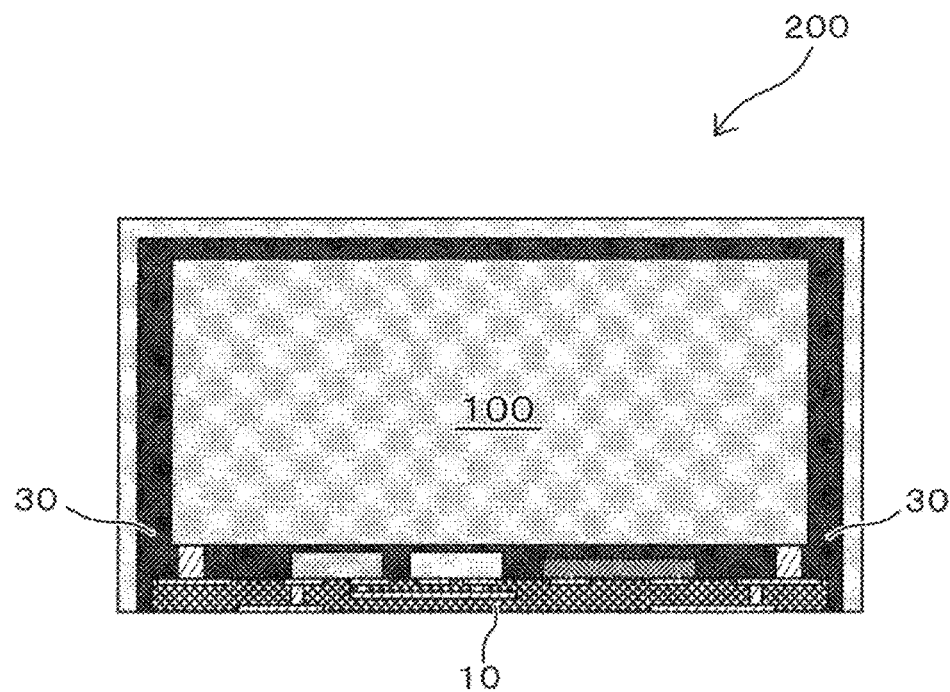
FIG. 7 is a schematic sectional view for explaining a modified aspect of a covering insulation film.

The covering insulation layer 30 is not limited to the form illustrated in FIG. 3, and may have a form as illustrated in FIG. 7. In other words, the covering insulation layer 30 may reach the side face of the substrate 10. In other words, the covering insulation layer 30 covering the top face and side face of the solid-state battery 100 may cover the side face of the substrate 10. This means that not only the covering inorganic film 40 but also the covering insulation layer 30 extends to the side face of the substrate. In other words, both the covering inorganic film and the covering insulation layer may extend so as to exceed the main face of the substrate (namely, the substrate face on which the circuit is provided) as in the sectional view illustrated in FIG. 7. The covering inorganic film and the covering insulation layer are thus provided as a more suitable water vapor barrier for the circuit on the main face of the substrate. Such an extending form of the covering inorganic film and covering insulation layer may also contribute to the avoidance of inconvenient peeling off of the covering insulation layer due to expansion and contraction of the solid-state battery.

This will be described in detail. When the expansion and contraction of the solid-state battery (particularly the expansion and contraction in the laminated direction of the solid-state battery) is excessive in the form illustrate in FIG. 3, a phenomenon is likely to occur that the covering insulation layer 30 peels off from the substrate 10 starting from the bonding interface between the covering insulation layer 30 and the main face of the substrate 10 (particularly the bonding interface a that forms the outermost edge along the direction orthogonal to the laminated direction), but such a possibility is diminished in the form illustrated in FIG. 7. The covering insulation layer 30 illustrated in FIG. 7 does not form a bonding face that forms the outermost edge with the main face of the substrate 10, and thus the inconvenient influence of the expansion and contraction of the solid-state battery in the laminated direction is unlikely to be exerted on the covering insulation layer 30.

Figure 8:
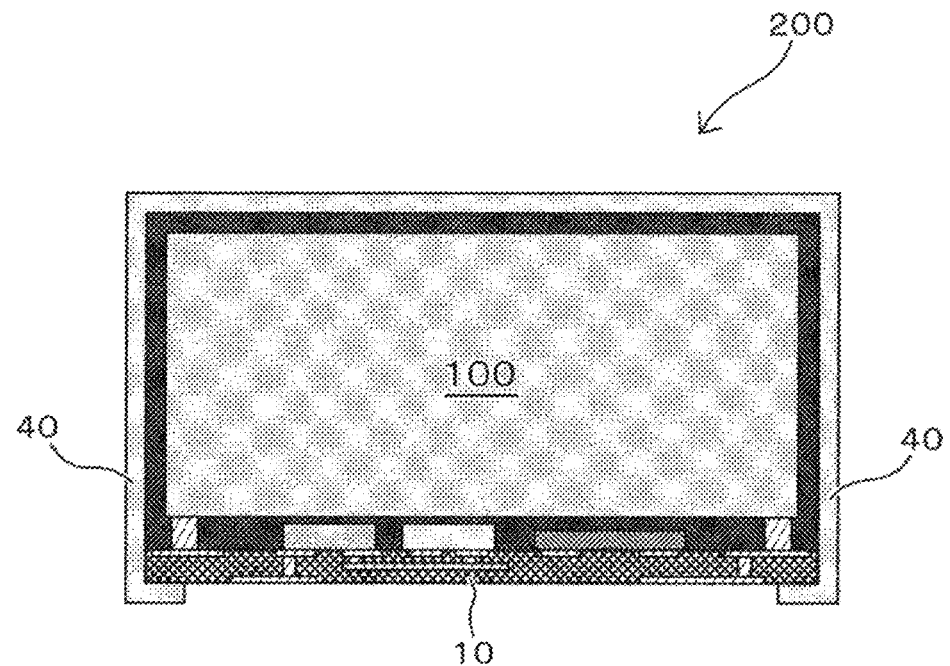
FIG. 8 is a schematic sectional view for explaining a modified aspect of a covering insulation film.
Figure 9:
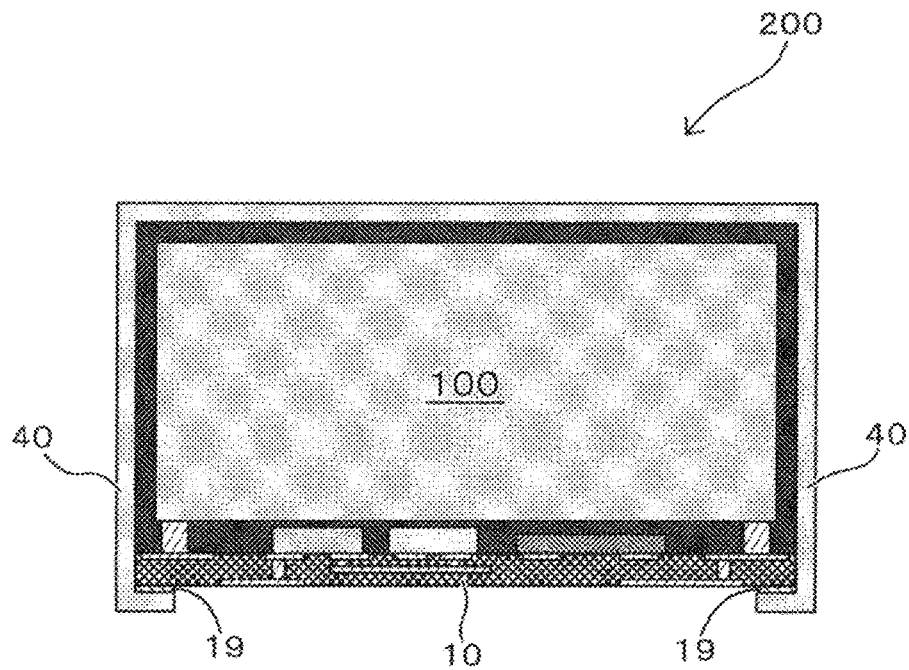
FIG. 9 is a schematic sectional view for explaining a modified aspect (using a metal pad) of a covering inorganic film.

Regarding peeling off, the covering inorganic film 40 may also be less likely to peel off from the substrate. For example, the covering inorganic film 40 may have a form as illustrated in FIG. 8. Specifically, the covering inorganic film 40 may extend from the side face of the substrate 10 to the lower side main face of the substrate 10. In such a case, the bonding area between the covering inorganic film 40 and the substrate 10 relatively increases, and the covering inorganic film 40 becomes more resistant to peeling off. In other words, in the illustrated sectional view, the covering inorganic film 40 has a bent form that follows the outer contour of the substrate 10. When the substrate is formed of ceramic or the like, a metal pad may be interposed to strengthen the bonding between the covering inorganic film 40 and the substrate 10. For example, a metal pad 19 may be provided on the substrate, and the covering inorganic film 40 may be provided so as to reach the metal pad 19 (see FIG. 9). As illustrated, such a metal pad 19 may be provided, for example, on the peripheral edge of the back side main face (namely, the bottom side main face) of the substrate 10.

Figure 10:
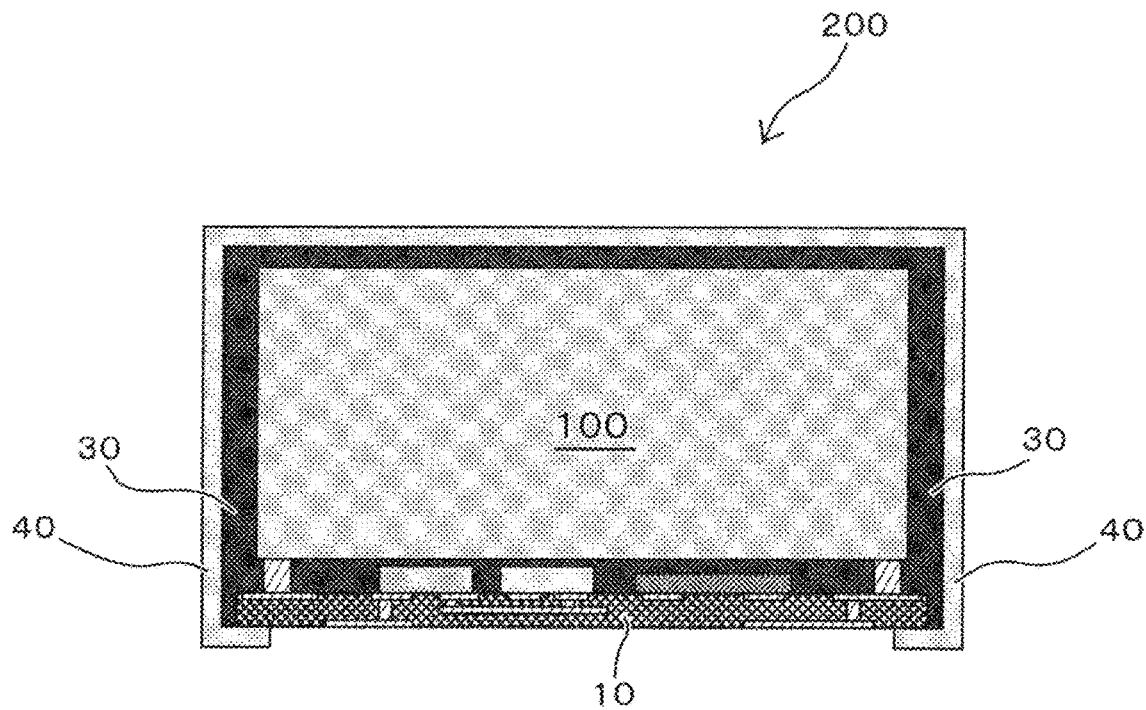
FIG. 10 is a schematic sectional view for explaining modified aspects of a covering insulation film and a covering inorganic film.

Furthermore, the covering insulation layer 30 and the covering inorganic film 40 may have a form as illustrated in FIG. 10. Specifically, the covering insulation layer 30 may also cover the side face of the substrate 10 as well as the covering inorganic film 40 may reach the lower side main face of the substrate 10. In other words, the covering insulation layer 30 covering the top face and side face of the solid-state battery 100 may extend to the side face of the substrate 10 as well as the covering inorganic film 40 on the covering insulation layer 30 may exceed the side of the substrate 10 and extend to the lower side main face of the substrate 10. In the case of such a form, a battery package product may be provided in which moisture transmission (moisture transmission from the outside to the solid-state battery laminate) is more suitably prevented.

In the battery package product of the present invention, although water vapor transmission is prevented, members that contribute to this are a covering inorganic thin film integrated with a covering insulation layer and a support substrate that may have a thin plate shape, and thus the package/size does not inconveniently increase. In other words, a compact package product may be provided while achieving water vapor transmission. This means that the solid-state battery of the present invention may be provided as a high energy density battery (packaged battery) in which water vapor transmission is prevented.

The solid-state battery of the present invention may be embodied in various aspects. For example, the following aspects may be considered.

(Aspect of Multilayer Wiring Board)

In this aspect, the support substrate has the form of a multilayer wiring board. In other words, the solid-state battery is supported by a support substrate having a plurality of wiring layers.

When the substrate has multilayer wiring, the degree of freedom in designing external terminals as a package product increases. In other words, the external terminal can be positioned at an arbitrary place on the bottom face of the battery package product.

The place where the wiring is provided on the support substrate or the vicinity thereof is the place of the interface between different materials of the wiring and the support substrate body portion, and becomes a place where water vapor transmission is unintentionally caused in some cases. However, when the support substrate has the form of a multilayer wiring board, the "place exhibiting relatively high water vapor transmitting property" that may correspond to the water vapor entry path becomes long. Although it is merely an example, such a water vapor entry path may reach the water vapor transmission path length of a capacitor terminal structure (about 200 μm at the longest). In other words, when the support substrate has the form of a multilayer wiring board, the movement resistance (resistance that moisture may receive) increases with respect to the moisture path from the external environment to the solid-state battery, water vapor is less likely to enter from the external environment, and thus a solid-state battery may be realized in which water vapor transmission is more suitably prevented. In a certain suitable aspect, the upper and lower wirings in the multilayer wiring board are not connected with series vias, but the via positions may be shifted to the left and right so that the wirings extending in the vertical direction meander. In this way, the water vapor entry path can be increased in length as the via is longer, and this leads to more suitable prevention of water vapor entry.

(Aspect Containing Filler)

In this aspect, the covering insulation layer 30 (see FIG. 11) of the covering member 50 contains a filler. When the covering insulation layer 30 is formed of a resin material, an inorganic filler 35 is preferably dispersed in such a resin material.

The filler is preferably mixed into the covering insulation layer and compositely integrated with the base material (for example, resin material) of the covering insulation layer. The shape of the filler is not particularly limited and may be granular, spherical, needle-like, plate-like, fibrous, and/or amorphous. The size of the filler is also not particularly limited and may be 10 nm or more and 100 µm or less, and the filler may be, for example, a nanofiller having a size of 10 nm or more and less than 100 nm, a microfiller having a size of 100 nm or more and less than 10 µm, or a macrofiller having a size of 10 µm or more and 100 µm or less. Examples of the material for the filler include, but are not limited to, metal oxides such as silica, alumina, titanium oxide, and zirconium oxide, minerals such as mica, and/or glass.

The filler is preferably a water vapor transmission preventing filler. In a certain suitable aspect, the covering insulation layer contains a water vapor transmission preventing filler in the resin material thereof. By this, the covering insulation layer is likely to be used as a more suitable water vapor transmission barrier together with the covering inorganic film.

The water vapor transmission preventing filler is not particularly limited, but may be a plate-like filler and the like. The water vapor transmission preventing filler may contain a material such as silica or alumina. The water vapor transmission preventing filler may contain a mica-based material such as synthetic mica. In order to contribute to more suitable water vapor transmission prevention, the content of the water vapor transmission preventing filler contained in the resin material is preferably 50% by weight or more and 95% by weight or less based on the total weight of the covering insulation layer, and may be, for example, 60% by weight or more and 95% by weight or less, or 70% by weight or more and 95% by weight or less.

(Aspect of Sputtered Film)

In this aspect, the covering inorganic film 40 (see FIG. 11) of the covering member 50 is a sputtered film. In other words, a sputtered thin film is provided as a dry plating film provided so as to cover the covering insulation layer.

The sputtered film is a thin film obtained by sputtering. In other words, a film in which ions are sputtered onto a target to knock out the atoms and deposit the atoms of the target on the covering insulation layer is used as the covering inorganic thin film.

This sputtered film becomes a dense and/or homogeneous film while having a significantly thin form of a nano-order or micro-order, and is thus preferable as a water vapor transmission barrier for solid-state batteries. The sputtered film is formed by atomic deposition, thus has a relatively high adhesive force and may be more suitably integrated with the covering inorganic thin film. Hence, the sputtered film is likely to constitute a water vapor barrier film more suitably for the solid-state battery together with the covering insulation layer. In other words, the sputtered film provided so as to cover at least the top face and side face of the solid-state battery together with the covering insulation layer may be more suitably used as a barrier to prevent water vapor in the external environment from entering the solid-state battery.

In a certain suitable aspect, the sputtered film contains at least one selected from the group consisting of, for example, Al (aluminum), Cu (copper), and Ti (titanium), and the thickness thereof is 1 µm or more and 100 µm or less, for example, 5 µm or more and 50 µm or less. Although not particularly limited, it is preferable that the sputtered film has substantially the same thickness dimension both at a local place positioned on the top face of the solid-state battery and a local place positioned on the side face of the solid-state battery. This is because the ingress of water vapor in the external environment into the battery can be more uniformly prevented as the whole package product.

A dry plating film represented by such a sputtered film can be realized in a more suitable thickness from the viewpoint of a water vapor barrier. For example, the dry plating film can be provided as a thicker film by relatively increasing the number of sputterings, while the dry plating film can also be provided as a thinner film by relatively decreasing the number of sputterings. For example, the dry plating film can be used as a covering inorganic film having a laminated structure by changing the kind of target at the time of sputtering.

A wet plating film may be provided on the dry plating film. In other words, the covering inorganic film 40 may be composed of a dry plating film and a wet plating film.

The wet plating film is generally formed at a higher deposition rate than the dry plating film. Hence, when a thick film is provided as a covering inorganic film, efficient film formation can be performed by combining the dry plating film with the wet plating film.

(Aspect Depending on Manufacturing Method)

In this aspect, the solid-state battery has features particularly derived from the packaging thereof. The packaged solid-state battery of the present invention is obtained by a manufacturing method described later and thus has features derived from the manufacturing method.

For example, in the solid-state battery of the present invention, the covering inorganic film is provided so as to cover the covering insulation layer, but is largely provided so as to reach the support substrate.

Figure 11:
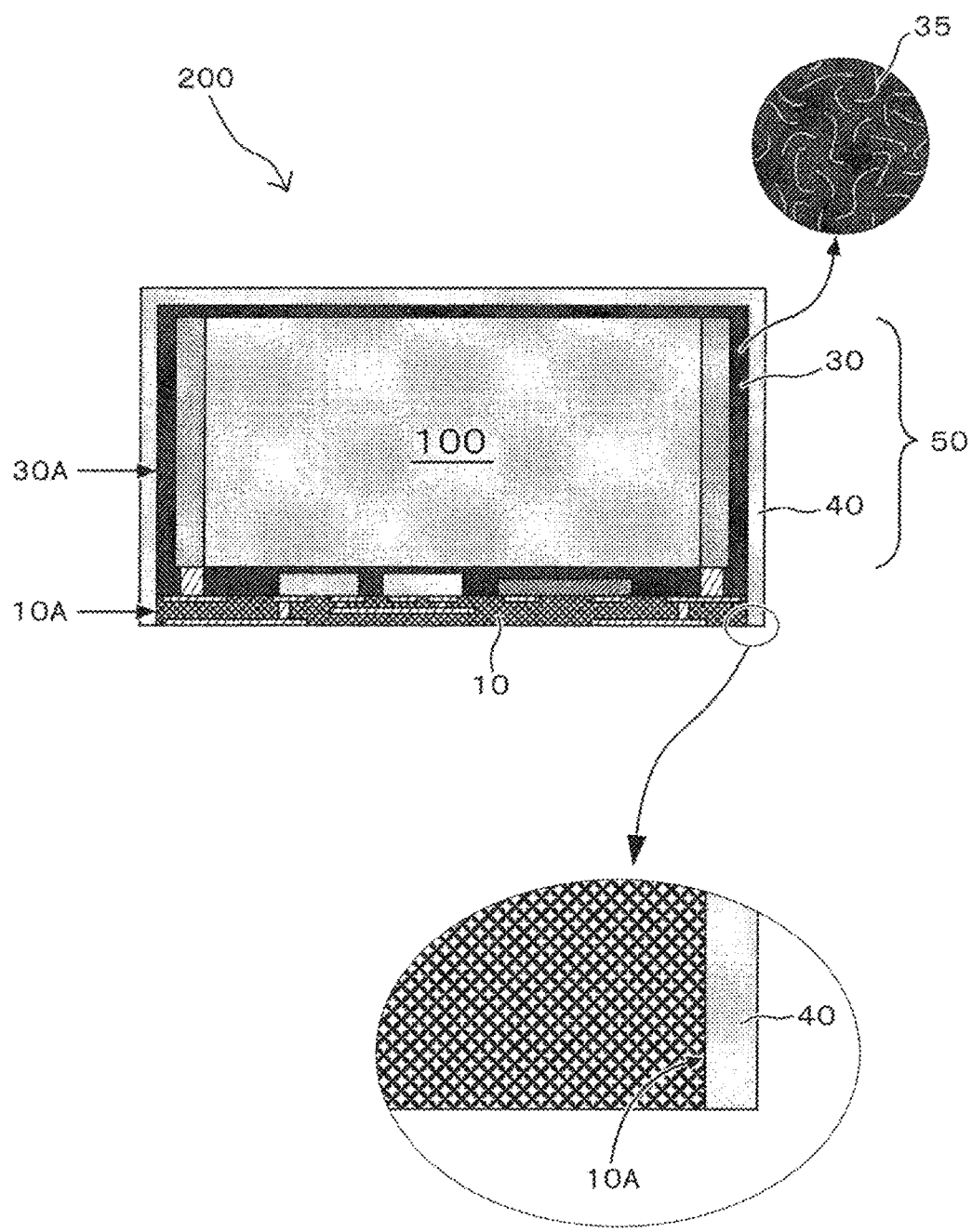
FIG. 11 is a sectional view schematically illustrating the configuration of a solid-state battery according to another embodiment (an aspect in which a covering insulation layer contains a filler, an aspect in which a covering inorganic film largely extends so as to reach a support substrate, and an aspect in which a support substrate and a covering inorganic film are flush with each other) of the present invention.
Figure 12A:
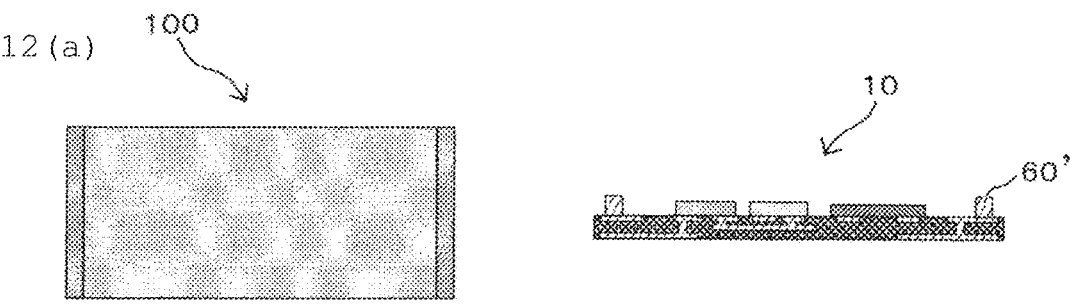
FIGS. 12(*a*) to 12(*d*) are process sectional views schematically illustrating a process of obtaining a solid-state battery of the present invention.
Figure 12B:
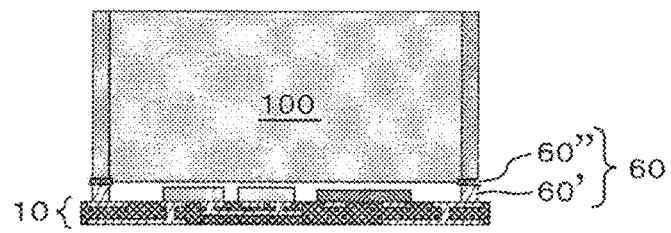
Figure 12C:
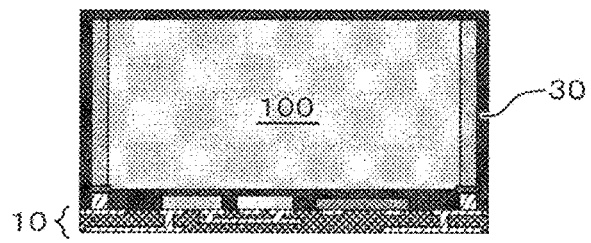
Figure 12D:
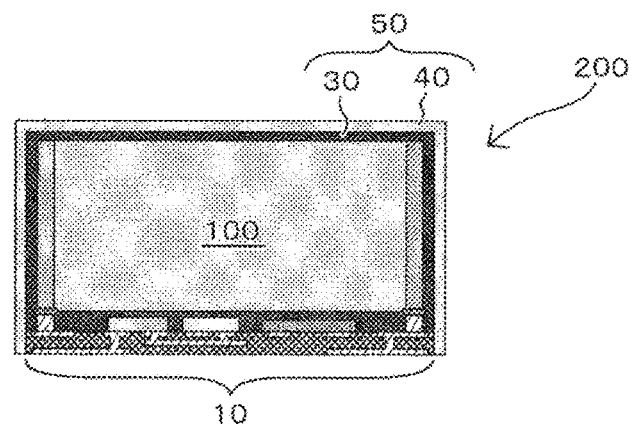

Specifically, as illustrated in FIG. 11, in sectional view of the packaged solid-state battery 100, the covering inorganic film 40 exceeds the covering insulation layer 30 to reach a side face 10A of the support substrate 10. As can be seen from the illustrated form of sectional view, this means that the covering inorganic film 40 extends to the position exceeding the boundary between the covering insulation layer 30 and the support substrate 10. Hence, such a covering inorganic film can be more suitably used as a water vapor transmission barrier of the solid-state battery together with the covering insulation layer. The solid-state battery of this aspect can be obtained by further largely covering a precursor obtained by covering a solid-state battery on a support substrate with a covering insulation layer with a covering inorganic film. In other words, by the formation of such a large covering film, the covering inorganic film 40 exceeds the covering insulation layer 30 and reaches the side face 10A of the support substrate 10. For example, by totally performing sputtering on the precursor obtained by covering the solid-state battery on the support substrate with a covering insulation layer, a covering inorganic film in such a unique form can be obtained. In the sectional view as illustrated in FIG. 11, the covering inorganic film 40 on the side face of the battery package product has a form extending straight (a form that extends straight in the vertical direction in section view), but the present invention is not necessarily limited thereto. For example, in sectional view, when a lateral outer face 30A of the covering insulation layer 30 is positioned slightly inner side (slightly inner side in the crosswise direction/horizontal direction) than the side face 10A of the support substrate 10 as a whole, the covering inorganic film 40 extends accordingly. In other words, when it is perceived that the covering inorganic film 40 extends in the direction from the upper side to the lower side in sectional view, the covering inorganic film 40 may be in a form in which the covering inorganic film 40 slightly expands outward and extends in the vicinity of the boundary between the covering insulation layer 30 and the support substrate 10.

In a certain suitable aspect, the support substrate and the covering inorganic film are flush with each other on the bottom side face of the integrated body of the solid-state battery and the substrate. In other words, the support substrate 10 and the covering inorganic film 40 are preferably flush with each other on the bottom side face of the packaged solid-state battery (see FIG. 11). In other words, on the mounting face of the package product of the solid-state battery, the surface level of the support substrate and the level of the covering inorganic film are the same or substantially the same as each other. Such a "flush" feature is due to the fact that the covering inorganic film is formed in a state in which the precursor is placed on an appropriate table or the like.

A solid-state battery having a "flush" feature means that the mounting face as a package product is suitably flattened/smoothed, and is thus likely to have more suitable mounting properties (particularly SMD property). In other words, the covering inorganic film 40 that exceeds the covering insulation layer 30 to reach the side face 10A of the support substrate 10 and is flush with the support substrate 10 not only suitably contribute to the prevention of water vapor transmission but also may contribute to more suitable surface mounting properties.

The advantages of the solid-state battery described above can be summarized as follows. The following advantages are merely exemplary and are not limited, and there may be additional advantages.

The package/size including peripheral circuits can be decreased, and the solid-state battery can be provided as a battery package product having a high energy density.

The wiring distance between the solid-state battery and the peripheral circuits can be shortened, the failure occurring rate can be decreased in the middle of the circuit, and a highly reliable battery package product can be obtained.

The electronic parts mounted on the support substrate are not only barriered to water vapor, but are also fixed to the support substrate having a high degree of rigidity, and are thus resistant to physical stress such as thermal stress/deflection drop vibration impact.

The electrical contacts between the peripheral circuits and the support substrate can be bonded with a solder-based highly reliable contact material, and thus a highly reliable battery package product can be obtained.

Peripheral circuits including multi-terminal electronic devices can be integrated with high reliability, and can be formed into a small module including the solid-state battery.

Multi-terminals can be disposed at any position on one plane with SMD-capable lands. Hence, the degree of freedom in designing the motherboard is improved, and the density can be increased.

By using a non-cleaning bonding material (a bonding material that does not require flux cleaning after soldering) as a bonding material that comes into direct contact with the battery, the solid-state battery can be mounted after electronic part mounting/cleaning in the manufacturing process. Hence, electronic parts can be subjected to flux cleaning when being bonded with solder that is highly reliable and cheaper and can increase the density of mounting area as well. Meanwhile, solid-state batteries are necessarily required to be bonded without cleaning, and thus both the batteries and SMD parts can be mounted in the package with an optimum bonding material.

A barrier film that protects the all-solid-state battery from water vapor covers a wide region without gaps, and it is thus possible to prevent the deterioration in properties due to water vapor in the external environment.

As an SMD type surface mount part, the solid-state battery can be solder mounted on any electronic device. In particular, the solid-state battery can be solder mounted as SMD exhibiting improved heat resistance and/or chemical resistance.

In the case of SMD type and when the surface of the support substrate is subjected to weather resistance treatment (for example, plating treatment with Ni/Au and the like) for mounting, the effect of preventing water vapor transmission is further improved by this weather resistance treatment.

[Method for Manufacturing Solid-State Battery]

The intended object of the present invention can be obtained through a process of fabricating a solid-state battery including a battery constituting unit having a positive electrode layer, a negative electrode layer, and a solid electrolyte interposed between these and then packaging the solid-state battery together with peripheral circuits.

The manufacturing process of this solid-state battery can be roughly divided into the manufacture of the solid-state battery itself (hereinafter, also referred to as "unpackaged battery") corresponding to the previous step of packaging, the fabrication of a support substrate, and the packaging.

<<Method for Manufacturing Unpackaged Battery>>

The unpackaged battery can be manufactured by a printing method such as a screen printing method, a green sheet method using a green sheet, or a composite method thereof. In other words, the unpackaged battery itself may be fabricated according to a conventional solid-state battery manufacturing method (hence, as the raw materials such as the solid electrolyte, the organic binder, the solvent, arbitrary additives, the positive electrode active material, and the negative electrode active material described below, those used in the manufacture of known solid-state batteries may be used).

Hereinafter, for a better understanding of the present invention, a certain manufacturing method will be illustrated and described, but the present invention is not limited to this method. In addition, the following time-dependent matters such as the order of description are merely for convenience of explanation and are not necessarily bound by them.

(Formation of Laminate Block)

A slurry is prepared by mixing a solid electrolyte, an organic binder, a solvent, and arbitrary additives together. Subsequently, a sheet having a thickness of about 10 μm after firing is obtained from the prepared slurry by sheet molding.

A positive electrode paste is prepared by mixing a positive electrode active material, a solid electrolyte, a conductive auxiliary agent, an organic binder, a solvent, and arbitrary additives together. Similarly, a negative electrode paste is prepared by mixing a negative electrode active material, a solid electrolyte, a conductive auxiliary agent, an organic binder, a solvent, and arbitrary additives together.

The positive electrode paste is printed on the sheet, and a current collector layer and/or a negative layer are printed if necessary. Similarly, the negative electrode paste is printed on the sheet, and a current collector layer and/or a negative layer are printed if necessary.

The sheet on which the positive electrode paste is printed and the sheet on which the negative electrode paste is printed are alternately laminated to obtain a laminate. The outermost layer (top layer/bottom layer) of the laminate may be an electrolyte layer, an insulation layer, or an electrode layer.
(Formation of Battery Sintered Body)

The laminate is pressure-bonded and integrated, and then cut into a predetermined size. The cut laminate thus obtained is subjected to degreasing and firing. A sintered laminate is thus obtained. The laminate may be subjected to degreasing and firing before being cut, and then cut.
(Formation of End Face Electrode)

The end face electrode on the positive electrode side can be formed by applying a conductive paste to the exposed side face of the positive electrode in the sintered laminate. Similarly, the end face electrode on the negative electrode side can be formed by applying a conductive paste to the exposed side face of the negative electrode in the sintered laminate. It is preferable that the end face electrodes on the positive electrode side and negative electrode side are provided so as to reach the main face of the sintered laminate since these can be connected to the mounting land in a small area in the next step (more specifically, the end face electrodes provided so as to reach the main face of the sintered laminate have a folded portion on the main face, and such a folded portion can be electrically connected to the support substrate). The component for the end face electrode may be selected from at least one selected from silver, gold, platinum, aluminum, copper, tin, or nickel.

The end face electrodes on the positive electrode side and negative electrode side are not limited to being formed after sintering of the laminate, and may be formed before firing and subjected to sintering at the same time.

By carrying out steps as described above, a desired unpackaged battery can be finally obtained.
<<Fabrication of Support Substrate with Part Mounted>>
(Fabrication of Support Substrate)

The support substrate can be fabricated, for example, by laminating and firing a plurality of green sheets. This can be said particularly when the support substrate is a ceramic substrate. The support substrate can be fabricated, for example, in conformity with the fabrication of LTCC substrate.

The support substrate used as a terminal substrate may have vias and/or lands. In such a case, for example, holes (diameter size: about 50 µm to about 200 µm) are formed on the green sheet by punch press, carbon dioxide gas laser or the like, a conductive paste material may be filled in the holes or a printing method and the like may be performed to form a conductive portion/wiring precursor such as vias, lands, and/or wiring layers. In particular, it is preferable that lands and the like are provided on the surface of the support substrate so as to be used for mounting parts of peripheral circuits. The support substrate has a non-connected metal layer that is not electrically connected as a water vapor transmission preventing layer in some cases. In such a case, a metal layer (precursor thereof) to be the non-connected metal layer may be formed on the green sheet. Such a metal layer may be formed by a printing method, or may be formed by disposing a metal foil or the like. Subsequently, a predetermined number of such green sheets are stacked and thermocompression bonded to form a green sheet laminate, and the green sheet laminate is subjected to firing, whereby the support substrate can be obtained. Lands and the like can also be formed after firing of the green sheet laminate.

Although it is merely an example and does not limit the present invention, the green sheet when the support substrate is obtained as a ceramic substrate will be described in detail. The green sheet itself may be a sheet-like member containing a ceramic component, a glass component, and an organic binder component. For example, the ceramic component may be alumina powder (average particle size: about 0.5 to 10 µm) and the glass component may be borosilicate glass powder (average particle size: about 1 to 20 µm). The organic binder component may be, for example, at least one component selected from the group consisting of polyvinyl butyral resin, acrylic resin, vinyl acetate copolymer, polyvinyl alcohol, and vinyl chloride resin. Although it is merely an example, the green sheet may contain alumina powder at 40% to 50% by weight, glass powder at 30% to 40% by weight, and an organic binder component at 10% to 30% by weight (based on the total weight of the green sheet). From another point of view, in the green sheet, the weight ratio of solid components (alumina powder 50% to 60% by weight and glass powder 40% to 50% by weight: based on the weight of solid components) to the organic binder component, namely the solid component weight: the organic binder component weight may be about 80 to 90:10 to 20. As green sheet components, components other than these may be contained if necessary, and for example, plasticizers that impart flexibility to the green sheet, such as phthalates and/or dibutyl phthalate, dispersants of ketones such as glycol, an organic solvent, and the like may be contained. The thickness of each green sheet itself may be about 30 µm to 500 µm.

By carrying out steps as described above, a desired support substrate can be finally obtained.
(Formation of Circuit on Support Substrate)

First, a solder material is applied to the support substrate obtained above. More specifically, for example, a metal mask is applied to the land provided on the substrate surface and the solder paste is applied thereto. Next, peripheral circuits for the solid-state battery are provided. More specifically, electronic parts such as active elements, passive elements, and/or auxiliary elements required for battery peripheral circuits are mounted at predetermined positions of the substrate. Members (for example, height adjustment terminal pins such as jumper pins, metal pillars, and metal lumps) that contribute to the electrical connection (positive electrode connection and negative electrode connection) between the solid-state battery and the support substrate and also to the formation of gaps between these such as conductive spacers are also mounted. When such desired mounting is completed, the support substrate is subjected to reflow soldering and flux cleaning. A support substrate on which a circuit is formed is thus obtained.

As the support substrate itself, a substrate having a substrate form in advance may be used as long as it has a water vapor transmission rate of less than $1.0 \times 10^{-3}$ g/(m$^2$·Day). Alternatively, a printed wiring board, LTCC board, HTCC board, or the like that has a water vapor transmission rate of less than $1.0 \times 10^{-3}$ g/(m$^2$·Day) and includes a circuit on the surface may be used.
<<Packaging>>

FIGS. 12(a) to 12(d) schematically illustrate steps of obtaining the solid-state battery of the present invention by packaging. For packaging, the solid-state battery 100 (hereinafter also referred to as "unpackaged battery") and support substrate 10 obtained above are used (FIG. 12(*a*)).

First, a connecting member 60" that contributes to electrical connection between the solid-state battery 100 and the support substrate 10 is formed on the conductive spacer 60' provided on the support substrate, and the solid-state battery 100 is mounted on the substrate through this (FIG. 12(*b*)). Specifically, for example, Ag conductive paste is supplied on the conductive spacer (conductive spacers on the positive electrode side and negative electrode side that contribute to the connection of the positive and negative electrodes of the solid-state battery, respectively) using a dispenser. Thereafter, the bottom portions of the end face electrodes on the positive electrode side and negative electrode side of the solid-state battery are placed on the conductive spacers on the positive electrode side and the negative electrode side, respectively, brought into close contact with the Ag conductive paste, and cured to perform bonding. More specifically, positioning is performed so that the conductive spacer on the positive electrode side provided on the surface of the support substrate is matched with the folded portion of the end face electrode on the positive electrode side of the solid-state battery as well as the conductive spacer on the negative electrode side is matched with the folded portion of the end face electrode on the negative electrode side of the solid-state battery, and bonding and connection is performed with the Ag conductive paste interposed therebetween. As such a bonding material, any conductive paste that does not require flux cleaning or the like after formation, such as nanopaste, alloy-based paste, or brazing material, can be used in addition to the Ag conductive paste. By using such a conductive paste as the battery connecting material, a final conductive spacer 60 has the non-cleaning type member 60" as a result.

Next, as illustrated in FIG. 12(*c*), the covering insulation layer 30 is formed so as to cover the solid-state battery 100 on the support substrate 10. Hence, the raw material for the covering insulation layer is provided so that the solid-state battery on the support substrate is totally covered. When the covering insulation layer is formed of a resin material, a resin precursor is provided on the support substrate and subjected to curing or the like to mold the covering insulation layer. In a certain suitable aspect, the covering insulation layer may be molded by subjecting the covering insulation layer to pressurization using a mold. Although it is merely an example, the covering insulation layer that seals the solid-state battery on the support substrate may be molded through compression/molding.

As long as it is a resin material generally used in molding, the form of the raw material for the covering insulation layer may be granular, and the kind thereof may be thermoplastic. Such molding is not limited to mold molding, and may be performed through polishing, laser machining, chemical treatment and/or the like.

Next, as illustrated in FIG. 12(*d*), the covering inorganic film 40 is formed. Specifically, the covering inorganic film 40 is formed on the "covering precursor in which each solid-state battery 100 is covered with the covering insulation layer 30 on the support substrate 10". For example, dry plating may be performed to form a dry plating film as a covering inorganic film. More specifically, dry plating is performed to form a covering inorganic film on an exposed face other than the bottom face of the covering precursor (namely, other than the bottom face of the support substrate). In a certain suitable aspect, sputtering is performed to form a sputtered film on the exposed outer face other than the bottom face of the covering precursor.

By carrying out steps as described above, it is possible to obtain a package product in which the solid-state battery on the support substrate is totally covered with the covering insulation layer and the covering inorganic film while having a circuit. In other words, the "packaged solid-state battery" according to the present invention can be finally obtained.

Regarding such packaging, there is an advantage that the terminal pulling out of the solid-state battery is relatively easy in terms of design and bonding process. The area proportion of package to the battery is smaller as the solid-state battery is smaller, but this area can be extremely decreased in the packaging according to the present invention, which may contribute to the miniaturization particularly of a battery having a small capacity.

The embodiments of the present invention have been described above, but these merely exemplify typical examples. Those skilled in the art will easily understand that the present invention is not limited to this, and various aspects can be considered without changing the gist of the present invention.

For example, in the above description, a drawing illustrating a form in which the lands of the support substrate have a one-to-one correspondence between the upper side and the lower side is used, but the present invention is not particularly limited to this.

The number of upper side lands and lower side lands connected by vias may differ from each other. For example, for a pair of upper and lower lands connected to each other by vias, there may be one upper side land and two or more lower side lands. This makes it possible to realize an SMD having a higher degree of freedom in design as the battery package product according to the present invention.

In the above description, an aspect in which the gap portion formed between the substrate and the solid-state battery is mainly caused by the conductive spacer has been described, but the present invention is not particularly limited to this. For example, the end face electrodes of the solid-state battery can also contribute to the formation of a gap between the substrate and the solid-state battery. Specifically, when the end face electrode of the solid-state battery extends not only to the end face of the sintered laminate but also to a part of the main face, the thickness of the end face electrode portion on the main face contributes to the formation of a gap between the substrate and the solid-state battery. The end face electrodes may include suitable leg members that particularly contribute to the formation of a gap between the substrate and the solid-state battery.

In the above description, it is premised that the solid-state battery on the substrate has a form in which the laminated direction of the respective layers constituting the solid-state battery is along the normal direction of the main face of the substrate, but the present invention is not particularly limited to this. For example, the solid-state battery may be provided on the substrate in a direction in which the laminated direction of the solid-state battery is orthogonal to the normal direction of the main face of the substrate.

In such a case, an inconvenient phenomenon that the battery comes into contact with the circuit on the substrate by the expansion and contraction of the solid-state battery (particularly expansion and contraction in the laminated direction of the solid-state battery) is less likely to occur.

Figure 13:
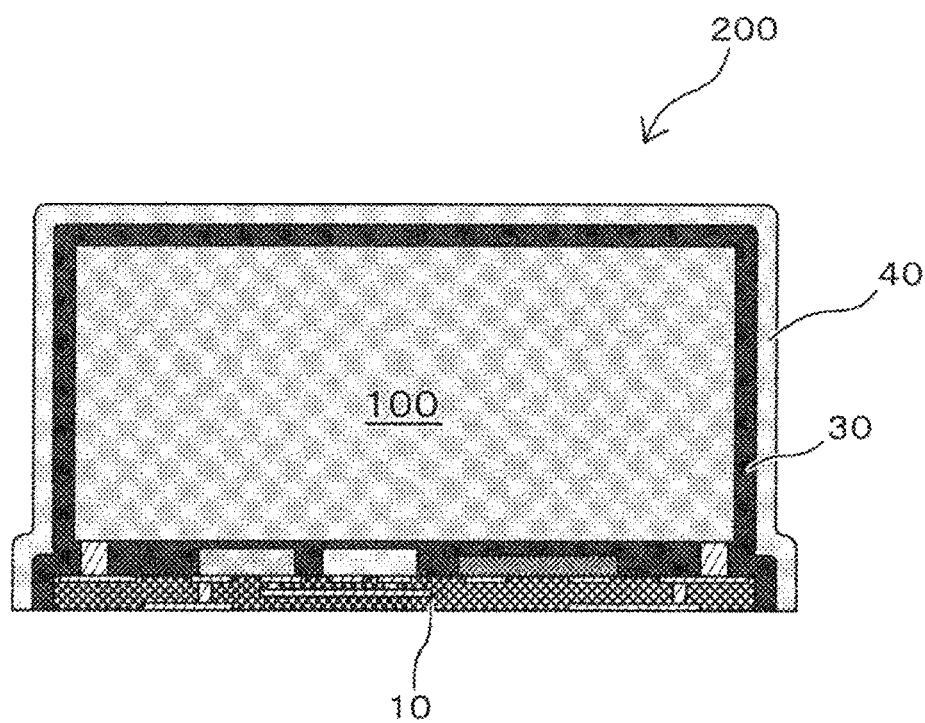
FIG. 13 is a schematic sectional view for explaining the form of a covering film formed by a coating method.

In the above description, an aspect in which the covering insulation layer is molded so as to largely seal the solid-state battery on the substrate through compression/molding has been described, but the present invention is not particularly limited to this. The covering insulation layer may be formed by a coating method such as spray atomization. In the case of using a coating method, as illustrated in FIG. 13, the shape of the covering insulation layer 30 in sectional view may relatively largely reflect the contours of the substrate 10 and the solid-state battery 100 on the substrate 10. In this case, the shape of the covering inorganic film 40 provided on the covering insulation layer 30 in sectional view may also relatively largely reflect the contours of the substrate 10 and the solid-state battery 100 on the substrate 10.

If necessary, an additional film may be provided on the covering inorganic film from the viewpoint of preventing rusting of the covering inorganic film. For example, an organic film formed of resin or the like may be provided on the covering inorganic film.

The packaged solid-state battery of the present invention can be utilized in various fields where battery use and power storage are assumed. Although it is merely an example, the packaged solid-state battery of the present invention can be utilized in the field of electronics mounting. The electrode of the present invention can be utilized in the fields of electricity/information/communication in which electric and electronic devices are used (for example, electric and electronic device fields or mobile device fields including mobile phones, smartphones, notebook computers and digital cameras, activity meters, arm computers, electronic paper, small electronic devices such as RFID tags, card-type electronic money, and smart watches, and the like), home/small-scale industrial applications (for example, fields of power tools, golf carts, home/nursing/industrial robots), large-scale industrial applications (for example, fields of forklifts, elevators, port cranes), transportation system fields (for example, fields of hybrid vehicles, electric vehicles, buses, trains, electrical power assisted bicycles, electric motorcycles, and the like), power system applications (for example, fields of various kinds of power generation, load conditioners, smart grids, general household power storage systems, and the like), medical applications (medical equipment fields such as earphone hearing aid), medicinal applications (fields of dose management system and the like), IoT field, space/deep sea applications (for example, fields of space probes, submersible research vehicles, and the like), and the like.

| DESCRIPTION OF REFERENCE SYMBOLS | |
|---|---|
| 10: | Support substrate |
| 14: | Via |
| 16: | Land |
| 17: | Conductive portion (substrate wiring) of support substrate |
| 19: | Metal pad |
| 30: | Covering insulation layer |
| 30': | Covering insulation layer (particularly covering insulation layer between solid-state battery and support substrate) |
| 35: | Filler |
| 40: | Covering inorganic film |
| 50: | Covering member |
| 60: | Conductive connecting portion |
| 80: | Circuit for solid-state battery |
| 100: | Solid-state battery |
| 100A: | Top face (upper face) of solid-state battery |
| 100B: | Side face of solid-state battery |
| 110: | Positive electrode layer |
| 120: | Negative electrode layer |
| 130: | Solid electrolyte |
| 150: | End face electrode |
| 150A: | End face electrode on positive electrode side |
| 150B: | End face electrode on negative electrode side |
| 200: | Battery package product (packaged solid-state battery) |

The invention claimed is:

1. A battery comprising:
   a substrate;
   a solid-state battery on the substrate;
   a circuit for the solid-state battery on the substrate, and between the substrate and the solid-state battery; and
   a resin material between the substrate and the solid-state battery and between the circuit and the solid-state battery such that, in a thickness direction of the battery, the solid-state battery, the resin, the circuit, and the substrate are arranged in this order.

2. The battery according to claim 1, wherein the circuit for the solid-state battery is on a main face of the substrate and the circuit extends in a plane direction of the main face.

3. The battery according to claim 1, wherein the circuit for the solid-state battery is at least one selected of a protection circuit, a charge control circuit, a temperature control circuit, an output compensation circuit, and an output stabilized power supply circuit.

4. The battery according to claim 1, further comprising:
   a covering insulation layer covering a top face and a side face of the solid-state battery; and
   a covering inorganic film on the covering insulation layer.

5. The battery according to claim 4, wherein the covering inorganic film extends so as to exceed a surface of the substrate on which the circuit is located in a sectional view of the battery.

6. The battery according to claim 4, wherein both the covering inorganic film and the covering insulation layer extend so as to exceed a surface of the substrate on which the circuit is located in a sectional view of the battery.

7. The battery according to claim 1, wherein the substrate is a support substrate that supports both the solid-state battery and the circuit on a same surface thereof.

8. The battery according to claim 1, wherein the substrate includes wiring that electrically connects upper and lower faces of the substrate and is configured as a terminal substrate for an external terminal of the solid-state battery.

9. The battery according to claim 1, wherein the resin material between the substrate and the solid-state battery fills a gap therebetween.

10. The battery according to claim 1, further comprising a conductive spacer between the substrate and the solid-state battery.

11. The battery according to claim 10, wherein the conductive spacer has a non-cleaning type member that does not require flux cleaning for soldering.

12. The battery according to claim 8, further comprising a conductive connecting member that connects an end face electrode of the solid-state battery and the wiring of the substrate to each other, wherein the circuit is positioned in a gap between the solid-state battery and the substrate formed by the conductive connecting member.

13. The battery according to claim 4, wherein the covering inorganic film is a metal film.

14. The battery according to claim 4, wherein the covering insulation layer contains a resin material.

15. The battery according to claim 4, wherein the substrate and the covering inorganic film are flush with each other on a bottom side face of an integrated body of the solid-state battery and the substrate.

16. The battery according to claim 1, wherein the substrate contains a ceramic.

17. The battery according to claim 1, wherein the solid-state battery is a sintered body.

18. The battery according to claim 1, wherein the solid-state battery includes a positive electrode layer and a negative electrode layer that are capable of storing and releasing a lithium ion.

* * * * *